United States Patent
Enomoto et al.

(10) Patent No.: US 10,028,208 B2
(45) Date of Patent: Jul. 17, 2018

(54) COMMUNICATION CONTROL METHOD, TERMINAL DEVICE, SERVER DEVICE, AND COMMUNICATION SYSTEM

(71) Applicant: SHARP KABUSHIKI KAISHA, Sakai, Osaka (JP)

(72) Inventors: Masayuki Enomoto, Sakai (JP); Masafumi Aramoto, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/126,164

(22) PCT Filed: Mar. 18, 2015

(86) PCT No.: PCT/JP2015/058075
§ 371 (c)(1),
(2) Date: Sep. 14, 2016

(87) PCT Pub. No.: WO2015/141733
PCT Pub. Date: Sep. 24, 2015

(65) Prior Publication Data
US 2017/0105169 A1    Apr. 13, 2017

(30) Foreign Application Priority Data
Mar. 18, 2014  (JP) ................................. 2014-054952

(51) Int. Cl.
*H04W 4/00* (2018.01)
*H04W 48/16* (2009.01)
(Continued)

(52) U.S. Cl.
CPC ........... *H04W 48/16* (2013.01); *H04W 8/005* (2013.01); *H04W 8/26* (2013.01); *H04W 12/06* (2013.01);
(Continued)

(58) Field of Classification Search
CPC .............................. H04W 48/16; H04W 72/04
See application file for complete search history.

(56) References Cited

U.S. PATENT DOCUMENTS 9,320,067 B2 * 4/2016 Ho .......................... H04B 7/022
9,872,162 B2 * 1/2018 Hedman ............... H04W 76/14
(Continued)

FOREIGN PATENT DOCUMENTS

EP          3 018 965 A1     5/2016
WO     WO 2016/054578 A1    4/2016

OTHER PUBLICATIONS

3GPP TR 23.703 V1.0.0 (Dec. 2013); Technical Specification Group Services and System Aspects; Study on architecture enhancements to support Proximity-based Services (ProSe); (Release 12); 275 pages.

(Continued)

*Primary Examiner* — Steve D Agosta
(74) *Attorney, Agent, or Firm* — Birch, Stewart, Kolasch & Birch, LLP

(57) ABSTRACT

There is provided a communication system that performs a service based on ProSe under the management of a communication provider. A ProSe application code for discovering and detecting a proximity terminal is managed and a process based on a procedure associated with a ProSe service such as an announcement request, a monitoring request, or a match report request is performed based on the authentication of a server device operated by a communication provider. Means for invalidating the ProSe application code based on the policy of the communication provider is provided.

8 Claims, 9 Drawing Sheets

(51) Int. Cl.
*H04W 76/14* (2018.01)
*H04W 76/02* (2009.01)
*H04W 8/00* (2009.01)
*H04W 8/26* (2009.01)
*H04W 12/06* (2009.01)

(52) U.S. Cl.
CPC ......... *H04W 76/023* (2013.01); *H04W 76/14* (2018.02)

(56) References Cited

U.S. PATENT DOCUMENTS

| | | | | |
|---|---|---|---|---|
| 2014/0056220 | A1* | 2/2014 | Poitau | H04W 40/246 370/328 |
| 2014/0094213 | A1* | 4/2014 | Khoshnevis | H04W 52/383 455/522 |
| 2014/0192739 | A1* | 7/2014 | Liao | H04W 8/22 370/329 |
| 2014/0295868 | A1* | 10/2014 | Lee | H04W 76/046 455/452.1 |

OTHER PUBLICATIONS

3GPP TS 23.401 V11.7.0(Sep. 2013); Technical Specification Group Services and System Aspects; General Packet Radio Service (GPRS) enhancements for Evolved Universal Terrestrial Radio Access Network (E-UTRAN) access (Release 11); 285 Pages.
Ericsson, "Cleanup of definitions", 3GPP TSG-SA WG2 Meeting 101bis; S2-140711; San Jose Del Cabo, Mexico; Feb. 17-21, 2014; pp. 1-8.
Qualcomm Incorporated, Samsung, At&T, "Removal of Editor's Notes for other WGs", 3GPP TSG-SA WG2 Meeting #101bis; S2-140707; San Jose Del Cabo, Mexico, Feb. 17-21, 2014; pp. 5-9.
3rd Generation Partnership Project; Technical Specification Group Services and System Aspects; Proximity-based Services (ProSe); Stage 2 (Release 12), V12.0.0 (Feb. 2014), pp. 1-53.
"Missing Prodceudre on ProSe Application Code Revocation", 3GPP TSG-WG2 Meeting #103, Phoenix, AZ, May 19-23, 2014, S2-141931, 4 pages.
"New Procedures for Open Direct Discovery", SA WG2 Meeting #107, 26-30 Jan. 2015, Sorrento, Italy, S2-150120, pp. 1-10.

* cited by examiner (a)

(b)

COMMUNICATION CONTROL METHOD, TERMINAL DEVICE, SERVER DEVICE, AND COMMUNICATION SYSTEM

TECHNICAL FIELD

The present invention relates to a communication control method, and a communication system including a terminal device and a server device.

BACKGROUND ART

In the 3rd Generation Partnership Project (3GPP) that standardizes recent mobile communication systems, the specifications of an Evolved Packet System (EPS) described in NPL 1, which realizes an all-IP network, has progressed. In the 3GPP, an access system connected to the EPS has also been examined in the case of a wireless LAN in addition to LTE.

The 3GPP has examined a proximity-based service (ProSe) described in NPL 2 in the specifications of the EPS. ProSe seek the realization of a service that provides a function (direct communication) of detecting a proximity communication terminal between user equipments (UEs) which are communication terminals or a function of establishing direct communication without using a core network or a base station between the UEs.

In ProSe, since communication is performed without using the core network to which the base station or the access network is connected, it is possible to avoid the concentration in the access network or the core network (congestion avoidance), and it is possible to expect an offloading effect.

In ProSe, a service that searches for and detects communication target UE of the direct communication is required to establish a direct communication path. In ProSe, two methods have been examined as the detection method. The first method is a method (hereinafter, direct discovery) in which the UE directly detects the communication target UE. The second method is a method (hereinafter, EPS discovery) in which the UE detects the communication target UE via the access network or the core network. However, a ProSe service is provided by a mobile communication provider, and needs to be approved by the mobile communication provider for commercial use.

In ProSe, the use of two methods as the direct communication path between the UEs has been examined. The first method is a method of using a LTE access technology. The second method is a method of using, a wireless LAN (WLAN) access technology.

In ProSe, non-public safety and public safety are defined. In the non-public safety, a commercial service provided by the mobile communication provider is assumed, and can be used only in a case where the UE is served by a LTE base station. Meanwhile, in the public safety, the use by a wireless disaster-prevention system is assumed, and can be used both in a case where the UE is served by the LTE base station and a case where the UE is not served by the LTE base station (eNB).

CITATION LIST

Non Patent Literature

NPL 1: 3GPP TS23.401 Technical Specification Group Services and System Aspects, General Packet Radio Service (GPRS) enhancements for Evolved Universal Terrestrial Radio Access Network (E-UTRAN) access NPL 2: 3GPP TR23.703 Technical Specification Group Services and System Aspects, Study on architecture enhancements to support Proximity-based Services (ProSe)

SUMMARY OF INVENTION

Technical Problem

In ProSe, means for realizing a function (discovery) of detecting UE positioned in proximity or a function (direct communication) of establishing direct communication without using the core network or the base station between the UEs has been examined.

In order to realize the function (discovery) of detecting the UE positioned in proximity, an announcement function of allowing the UE to notify the proximity terminal of the presence of this UE, a monitoring function of receiving the notification based on the announcement function to detect the proximity terminal, and a match reporting function of receiving the notification based on the announcement function to check the content of the received notification have been examined.

In such functions based on the ProSe service, the communication provider generates the ProSe application code associated with an application. The communication terminal acquires the ProSe application code, and performs announcement, monitoring or match reporting.

As stated above, ProSe application code is notified to the communication terminal from the communication provider based on authentication or permission, and is information having high confidentiality which is required to prevent illegitimate acquisition or falsification by a third party. Thus, a utilization method having higher safety based on the management of the communication provider is needed for the ProSe application code. That is, the announcement function, the monitoring function or the match reporting function which are the functions of the ProSe service with which the ProSe application code is associated need to be methods having high safety.

However, specific means for realizing the ProSe function associated with the ProSe application code are currently not apparent.

The invention has been made in view of such circumstances, and it is an object of the invention to provide means for improving safety and realizing a function associated with ProSe such as a function (discovery) of detecting UE positioned in proximity.

Solution to Problem

There is provided a communication control method in a terminal device. The method includes: a step of transmitting a discovery request message including at least identification information for identifying an application and a command indicating whether to perform announcement or monitoring to a server device; a step of receiving, as a response to the discovery request message, a response message including at least a code associated with the identification information and a timer indicating an expiration date of the code from the server device; a step of starting to count the timer based on the reception of the response message; a step of receiving, as a request for requesting that the code is invalidated, a revocation request including at least the code from the server device; and a step of invalidating the code based on the reception of the revocation request.

The communication control method further includes: a step of transmitting, as a request for requesting that the code is invalidated, a request message for requesting that the server device transmits the revocation request including at least the code.

There is provided a communication control method in a terminal device. The method includes: a step of transmitting a discovery request message including at least identification information for identifying an application and a command indicating whether to perform announcement or monitoring to a server device; a step of receiving, as a response to the discovery request message, a response message including at least a first code associated with the identification information and a timer indicating an expiration date of the first code from the server device; a step of starting to count the timer based on the reception of the response message; a step of receiving, as a request for requesting that the first code is updated, an update request including at least the first code, a second code different from the first code and a timer indicating an expiration date of the second code from the server device; and a step of invalidating the first code and starting to count the timer of the second code, based on the reception of the update request.

The communication control method further includes: a step of transmitting, as a request for requesting that the first code is updated, a request message for requesting that the server device transmits the update request including the first code, the second code different from the first code and the timer indicating the expiration date of the second code.

The communication control method further includes: a step of performing announcement including the code by using a direct radio signal to a proximity terminal in a state in which an expiration date of the timer does not expire; and a step of releasing a radio resource for announcement based on the invalidation of the code in a case where the revocation request is received.

The communication control method further includes: a step of performing monitoring for receiving an announcement signal including the code by using a direct radio signal in a state in which an expiration date of the timer does not expire; and a step of releasing a radio resource for monitoring based on the invalidation of the code in a case where the revocation request is received.

There is provided a communication control method in a server device. The method includes: a step of receiving a discovery request message including at least identification information for identifying an application and a command indicating whether to perform announcement or monitoring from a terminal device; a step of authenticating the terminal device based on the reception of the discovery request message; a step of transmitting, as a response to the discovery request message, a response message including at least a code associated with the identification information and a timer indicating an expiration date of the code to the terminal device; a step of starting to count the timer; and a step of transmitting, as a request for requesting that the code is invalidated, a revocation request including at least the code to the terminal device within the expiration date of the code.

There is provided a communication control method in a server device. The method includes: a step of receiving a discovery request message including at least identification information for identifying an application and a command indicating whether to perform announcement or monitoring from a terminal device; a step of authenticating the terminal device based on the reception of the discovery request message; a step of transmitting, as a response to the discovery request message, a response message including at least a first code associated with the identification information and a timer indicating an expiration date of the first code to the terminal device; a step of starting to count the timer; and a step of transmitting, as a request for requesting that the first code is updated, an update request including at least the first code, a second code different from the first code and a timer indicating an expiration of the second code to the terminal device within the expiration date of the code.

There is provided a terminal device adapted to: transmit a discovery request message including at least identification information for identifying an application and a command indicating whether to perform announcement or monitoring to a server device; receive, as a response to the discovery request message, a response message including at least a code associated with the identification information and a timer indicating an expiration date of the code from the server device; start to count the timer based on the reception of the response message; receive, as a request for requesting that the code is invalidated, a revocation request including at least the code from the server device; and invalidate the code based on the reception of the revocation request.

The terminal device transmits, as a request for requesting that, the code is invalidated, a request message for requesting that the server device transmits the revocation request including at least the code.

There is provided a terminal device adapted to: transmit a discovery request message including at least identification information for identifying an application and a command indicating whether to perform announcement or monitoring to a server device; receive, as a response to the discovery request message, a response message including at least a first code associated with the identification information and a timer indicating an expiration date of the first code from the server device; start to count the timer based on the reception of the response message; receive, as a request for requesting that the first code is updated, an update request including at least the first code, a second code different from the first code and a timer indicating an expiration date of the second code from the server device; and invalidate the first code and start to count the timer of the second code, based on the reception of the update request.

The terminal device transmits, as a request for requesting that the first code is updated, a request message for requesting that the server device transmits the update request including the first code, the second code different from the first code and the timer indicating the expiration date of the second code.

The terminal device performs announcement including the code by using a direct radio signal or monitoring for receiving an announcement signal including the code, which is transmitted from a proximity terminal in a state in which an expiration date of the timer does not expire, and releases a radio resource for announcement or monitoring based on the invalidation of the code in a case where the revocation request is received.

The terminal device performs announcement including the first code by using a direct radio signal or monitoring for receiving an announcement signal including the first code, which is transmitted from a proximity terminal in a state in which an expiration date of the timer does not expire, and releases a radio resource for announcement or monitoring based on the invalidation of the first code in a case where the revocation request is received.

There is provided a server device adapted to: receive a discovery request message including at least identification information for identifying an application and a command indicating whether to perform announcement or monitoring from a terminal device; authenticate the terminal device based on the reception of the discovery request message; transmit, as a response to the discovery request message, a response message including at least a code associated with the identification information and a timer indicating an expiration date of the code to the terminal device; start to count the timer; and transmit, as a request for requesting that the code is invalidated, a revocation request including at least the code to the terminal device within the expiration date of the code.

There is provided a server device adapted to: receive a discovery request message including at least identification information for identifying an application and a command indicating whether to perform announcement or monitoring from a terminal device; authenticate the terminal device based on the reception of the discovery request message; transmit, as a response to the discovery request message, a response message including at least a first code associated with the identification information and a timer indicating an expiration date of the first code to the terminal device; start to count the timer; and transmit, as a request for requesting that the first code is updated, an update request including at least the first code, a second code different from the first code and a timer indicating an expiration date of the second code to the terminal device within the expiration date of the code.

There is provided a communication system including a terminal device and a server device. The terminal device transmits a discovery request message including at least identification information for identifying an application and a command indicating whether to perform announcement or monitoring to a server device. The server device authenticates the terminal device based on the reception of the discovery request message, and transmits, as a response to the discovery request message, a response message including at least a code associated with the identification information and a timer indicating an expiration date of the code to the terminal device. The terminal device receives, as a response to the discovery request message, a response message including at least a code associated with the identification information and a timer indicating an expiration date of the code from the server device, starts to count the timer based on the reception of the response message, performs a step of receiving, as a request for requesting that the code is invalidated, a revocation request including at least the code from the server device, and performs a step of invalidating the code based on the reception of the revocation request.

There is provided a communication system including a terminal device and a server device. The terminal device transmits a discovery request message including at least identification information for identifying an application and a command indicating whether to perform announcement or monitoring to a server device. The server device authenticates the terminal device based on the reception of the discovery request message, and transmits, as a response to the discovery request message, a response message including at least a first code associated with the identification information and a timer indicating an expiration date of the first code to the terminal device. The terminal device starts to count the timer based on the reception of the response message, receives, as a request for requesting that the first code is updated, an update request including at least the first code, a second code different from the first code and a timer indicating an expiration date of the second code from the server device, and invalidates the first code and starts to count the timer of the second timer, based on the reception of the update request.

Advantageous Effects of Invention

According to the present invention, it is possible to perform a service based on ProSe under the management of a communication provider.

DESCRIPTION OF EMBODIMENTS

Hereinafter, preferred embodiments for implementing the present invention will be described with reference to the drawings. As an example in the present embodiment, an embodiment of a mobile communication system in a case where the present invention is applied will be described.

1. Embodiment

Hereinafter, a wireless communication technology according to an embodiment of the present invention will be described in detail with reference to the drawings.

[1.1 Outline of Communication System]

Figure 1:
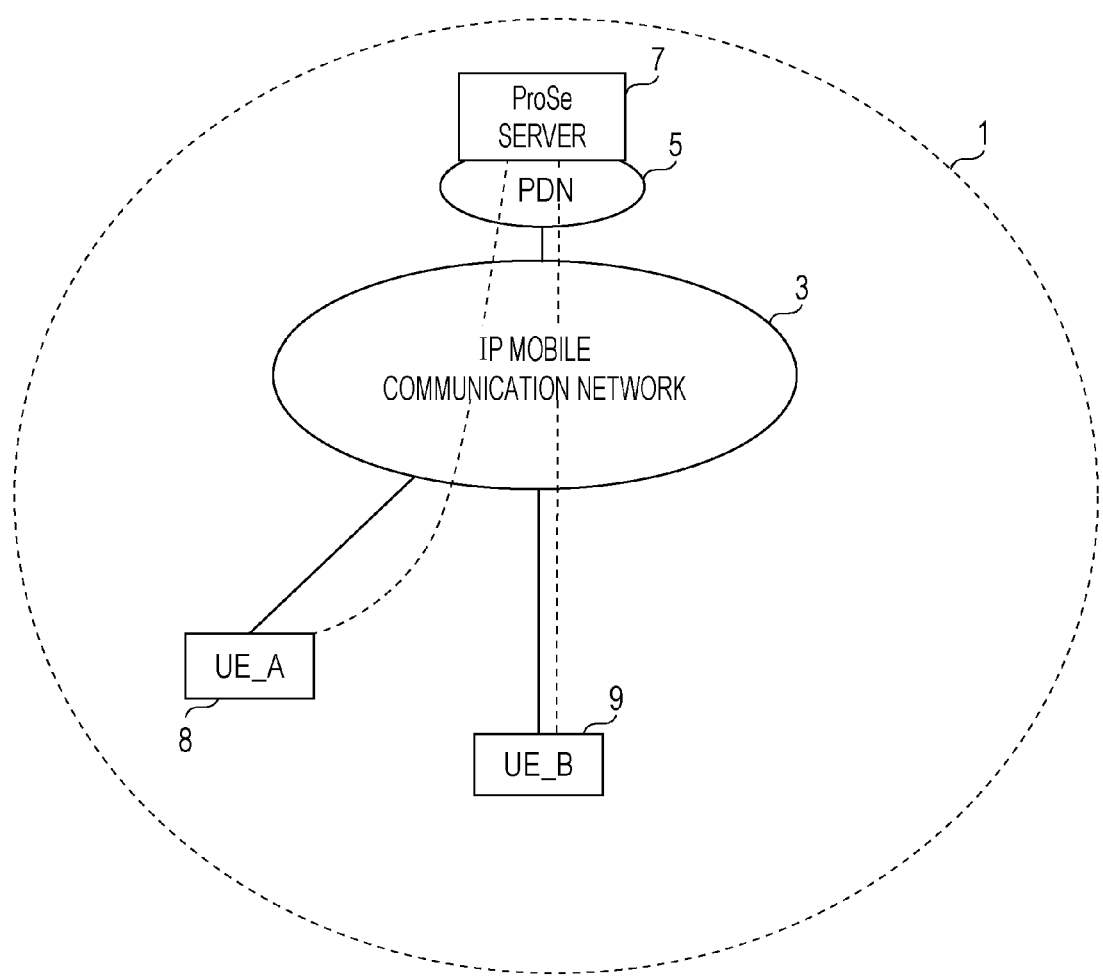
FIG. 1 is a schematic diagram for describing a mobile communication system.

FIG. 1 is a functional block diagram showing a schematic structure example of a communication system 1 according to the embodiment of the present invention.

The communication system 1 shown in FIG. 1 includes UE_A 8 which is a communication terminal having a function of ProSe, a packet data network (PDN) 5, an IP mobile communication network 3, and a ProSe server 7.

A plurality of communication terminals, such as UE_B 9, having a function of ProSe may be included.

The PDN 5 and the UE such as the UE_A 8 or the UE_B 9 are connected to each other via the IP mobile communication network 3. Services are provided to the UE_A 8 and the UE_B 9 based on ProSe.

The ProSe server 7 is a server device that manages communication of the UE_A 8 or the UE_B 9, and performs authentication when ProSe services are provided. The ProSe server 7 is included in the PDN 5 as shown in FIG. 1, but may be independent from the PDN 5.

The UE_A 8 and the UE_B 9 may be connected to the same mobile communication provider network, may be connected to different mobile communication operator networks, or may be a broadband network operated by a fixed communication provider.

The broadband network is an IP communication network which is operated by a communication provider that is connected through asymmetric digital subscriber line (ADSL) to provide high-speed communication through a digital line such as an optical fiber. The broadband network is not limited to the above-described example, and may be a network that is wirelessly accessed through worldwide interoperability for microwave access (WiMAX).

Each UE such as the UE_A 8 or the UE_B 9 is a communication terminal that is connected using an access system such as LTE or WLAN, and may be accessed to an IP access network through connection by including 3GPP LTE communication interface or WLAN communication interface.

The PDN 5 is a network that provides network services for performing transmission and reception of data in packets, and is, for example, the Internet or IMS.

The PDN 5 is connected to the IP access network by using a wired line. For example, the PDN is established using the ADSL or the optical fiber. However, the PDN is not limited to the above-described example, and may be a radio access network such as LTE, WLAN or worldwide interoperability for microwave access (WiMAX).

Figure 2:
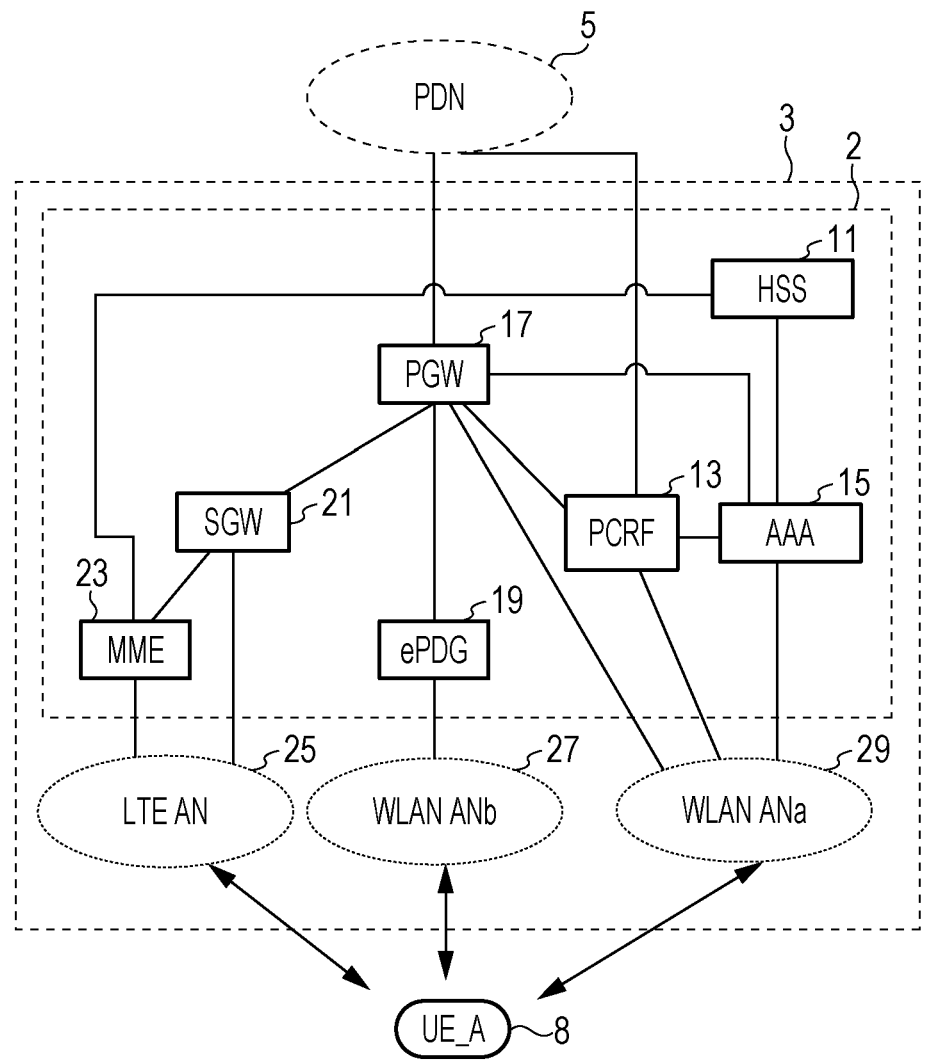
FIG. 2 is a diagram for describing a structure of an IP mobile communication network.
Figure 2:
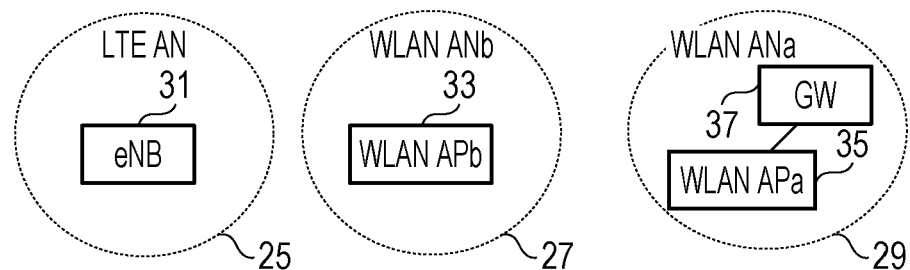

FIG. 2 is a detailed structure example of the communication system 1 shown in FIG. 1. The structure example of the system shown in FIG. 2 includes the UE_A 8, the IP mobile communication network 3, and the PDN 5. A plurality of UEs in addition to the UE_A 8 may be connected to the IP mobile communication network 3. Here, although FIG. 2 shows the example in which the UE_A 8 is connected, the UE_B 9 may have the same structure as that of the UE_A 8.

The IP mobile communication network 3 includes a core network 2, and radio access networks (LTE AN 25, WLAN ANb 27, and WLAN ANa 29). The core network 2 includes a home subscriber server (HSS) 11, Authentication, Authorization and Accounting (AAA) 15, a policy and charging rules function (PCRF) 13, a packet data network gateway (PGW) 17, an enhanced packet data gateway (ePDG) 19, a serving gateway (SGW) 21, and a mobile management entity (MME) 23.

The ProSe server 7 described using FIG. 1 may be included in the PDN 5 as shown in FIG. 1, may be included in the IP mobile communication network 3 independently from the PDN 5, or may be included in the core network 2.

The radio access network may include a plurality of different access networks. The access networks are connected to the core network 2. The UE_A 8 may be wirelessly connected to the radio access network.

The radio access network may include the LTE access network (LTE AN 25) capable of being connected by a LTE access system, and the access networks (WLAN ANb 27 and WLAN ANa 29) capable of being connected by a WLAN access system.

The access network capable of being connected by the WLAN access system may include the WLAN access network b (WLAN ANb 27) that is connected using the ePDG 19 as a connection apparatus to the core network 2, and the WLAN access network a (WLAN ANa 23) that is connected to the PGW 17, the PCRF 13 and the AAA 15.

Since the apparatuses have the same structure as that of the apparatus of the related art in the mobile communication system using EPS, the detailed description will be omitted. Hereinafter, the respective apparatuses may be simply described.

The PGW 17 is connected to the PDN 5, the SGW 21, the ePDG 19, the WLAN ANa 29, the PCRF 13, and the AAA 15, and serves as a gateway apparatus between the PDN 5 and the core network 2 to deliver user data.

The SGW 21 is connected to the PGW 17, the MME 23, and the LTE AN 25, and serves as a gateway apparatus between the core network 2 and the LTE AN 25 to deliver user data.

The MME 23 is connected to the SGW 21, the LTE AN 25, and the HSS 11, and is an access control apparatus that performs access control of the UE_A 8 via the LTE AN 25.

The HSS 11 is connected to the MME 23 and the AAA 15, and is a management node that manages subscriber information. For example, the subscriber information, of the HSS 11 is referred to when access control of the MME 23 is performed.

The AAA 15 is connected to the PGW 17, the HSS 11, the PCRF 13, and the WLAN ANa 29, and performs the access control of the UE_A 8 that is connected via the WLAN ANa 29.

The PCRF 13 is connected to the PGW 17, the WLAN ANa 29, the AAA 15 and the PDN 5, and performs QoS management for data delivery.

The ePDG 19 is connected to the PGW 17 and the WLAN ANb 27, and serves as a gateway apparatus between the core network 2 and the WLAN ANb 27 to deliver user data.

As shown in FIG. 2(b), an apparatus (for example, a base station apparatus or an access point apparatus) to which the UE_A 8 is actually connected is included in each radio access network. As the apparatus used in the connection, an apparatus adapted to the radio access network is considered.

In the present embodiment, the LTE AN 25 includes an eNB 31. The eNB 31 is a radio base station to which the UE_A 8 is connected in the LTE access system, and the LTE AN 25 may include one or a plurality of radio base stations.

The WLAN ANa 29 includes a WLAN APa 35, and a gateway (GW) 37. The WLAN APa 35 is a radio base station to which the UE_A 8 is connected in the WLAN access system having reliability against a provider that operates the core network 2, and the WLAN ANa 23 may include one or a plurality of radio base stations. The GW 37 is a gateway apparatus between the core network 2 and the WLAN ANa 29. The WLAN APa 35 and the GW 37 may be realized as a single apparatus.

Even though a provider that, operates the core network 2 and a provider that operates the WLAN ANa 29 are different, such a structure may be realized by a contract or an agreement between the providers.

The WLAN ANb 27 includes a WLAN APb 33. In a case where there is no trusting relationship with the provider that operates the core network 2, the WLAN APb 33 is a radio base station to which the UE_A 8 is connected in the WLAN access system, and the WLAN ANb 27 may include one or a plurality of radio base stations.

As state above, the WLAN ANb 27 is connected to the core network 2 by using the ePDG 19 which is an apparatus included in the core network 2 as a gateway. The ePDG 19 has a security function for ensuring safety.

In the present specification, a case where the UE_A 8 is connected to each radio access network is a case where this UE is connected to a base station apparatus or an access point included in each radio access network, and data or a signal is also transmitted or received via the base station apparatus or the access point.

[1.2 Structures of Devices]

The device structures of the UE_A 8, the UE_B 9 and the ProSe server 7 of FIG. 1 will be simply described with reference to the drawings.

[1.2.1 Structure of UE]

The UE_A 8 and the UE_B 9 may have the same structure. The UE_A 8 and the UE_B 9 may be wireless communication terminals having the ProSe function, may be mobile phone terminals that transmit and receive data through wireless communication by a LTE access method, or may be communication terminals that mutually exchange information in the form of so-called machine to machine.

Figure 3:
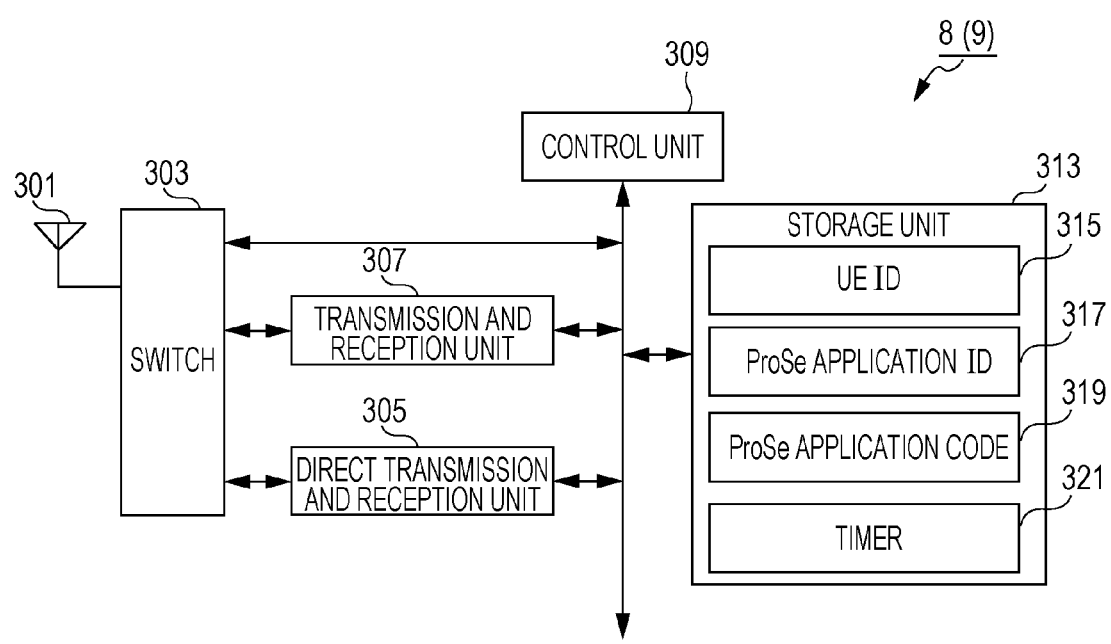
FIG. 3 is a diagram for describing a functional structure of UE.

FIG. 3 shows a functional structure of the UE_A 8 according to the present embodiment. Since the functional structure of the UE_B 9 may be the same as that of the UE_A 8, the description thereof will be omitted. The UE_A 8 includes a transmit and receive antenna 301, a switch 303, a direct transmission and reception unit 305, a transmission and reception unit 307, a control unit 309, and a storage unit 313. In the UE_A 8, the direct transmission and reception unit 305, the transmission and reception unit 307, the switch 303 and the storage unit 313 are connected to the control unit 309 via a bus.

The control unit 309 is a functional unit for controlling the UE_A 8. The control unit 309 is a functional unit which reads various programs stored in the storage unit 313 and executes the read program.

The switch 303 is a functional, unit that connects the transmission and reception unit 307 and the direct transmission and reception unit 305 to the transmit and receive antenna 301 according to the control of the control unit 309.

The transmission and reception unit 307 is a functional unit that transmits and receives wireless communication data by the LTE access method. The transmission and reception unit 307 includes a transmission unit and a reception unit. The transmission unit may transmit data or control information via a LTE base station, and the reception unit may transmit data or control information via the LTE base station.

The direct transmission and reception unit 305 is a functional unit capable of directly communicating with another UE using data or control information without using the LTE base station. The direct transmission and reception unit 305 includes a direct transmission unit and a direct reception unit. The direct transmission unit may transmit data or control information without using the LTE base station, and the direct reception unit may receive data or control information without using the LTE base station. The transmission and reception unit 307 and the direct transmission and reception unit 305 may be realized as one transmission and reception unit.

The storage unit 313 is a functional unit that stores data or program required in each operation of the UE_A 8. For example, the storage unit 313 is a semiconductor memory or a hard disk drive (HDD).

The storage unit 313 may store a UE ID 315, a ProSe application ID 317, a ProSe application code 319, and a timer 321. The UE_A 8 may store a UE context including these information items.

The UE ID 315 may be identification information for identifying the UE_A 8, and may be identification information such as IMSI or MSISDN. Alternatively, the UE ID may be a Prose ID which is acquired from the ProSe server 7 through a service authentication procedure to be described below and is associated with the UE_A 8.

The ProSe application ID 317 may be identification information used in ProSe direct discovery that detects a proximity terminal, or may be information for identifying an application executed by a communication terminal that detects the proximity terminal through ProSe. The ProSe application ID may be a specific name of the application.

The ProSe application code 319 may be a code associated with the ProSe application ID. The ProSe application code may be a code which is transmitted while being included in an announcement signal for allowing the proximity terminal to discover the UE or is used to monitor an announcement signal transmitted by the proximity terminal. The more detailed description will be described below, and thus, the description will be omitted now.

The timer 321 is used to indicate that the ProSe application code can be legitimately used, and may legitimately use the ProSe application code until the timer is expired.

Here, the UE_A 8 may store the ProSe application ID 317 and the ProSe application code 319 so as to associate this ID with this code.

The ProSe application code 319 and the timer 321 may be stored in association with each other. The UE_A 8 may retain a timer for announcement and a timer for monitoring in a case where announcement for allowing the proximity terminal to discover the UE_A 8 and monitoring for detecting the proximity terminal are performed. As mentioned above, a plurality of timers may be stored for one ProSe application code.

In a case where the proximity terminal is detected, the UE_A 8 may store the UE ID of the proximity terminal. A plurality of proximity terminals may be detected, or a plurality of UE IDs may be stored.

When the monitoring for detecting the proximity terminal is performed, in a case where a discovery filter for monitoring is received from the ProSe server 7, the discovery filter may be stored.

The discovery filter may be managed in association with the ProSe application ID 317, the ProSe application code 319 or the timer 321.

When the monitoring for detecting the proximity terminal is performed, in a case where a discovery filter ID for identifying the discovery filter is received from the ProSe server 7 in addition to the discovery filter for performing monitoring, the discovery filter ID may be stored.

The discovery filter ID and the discovery filter may be stored in association with each other.

[1.2.2 Structure of ProSe Server]

Figure 4:
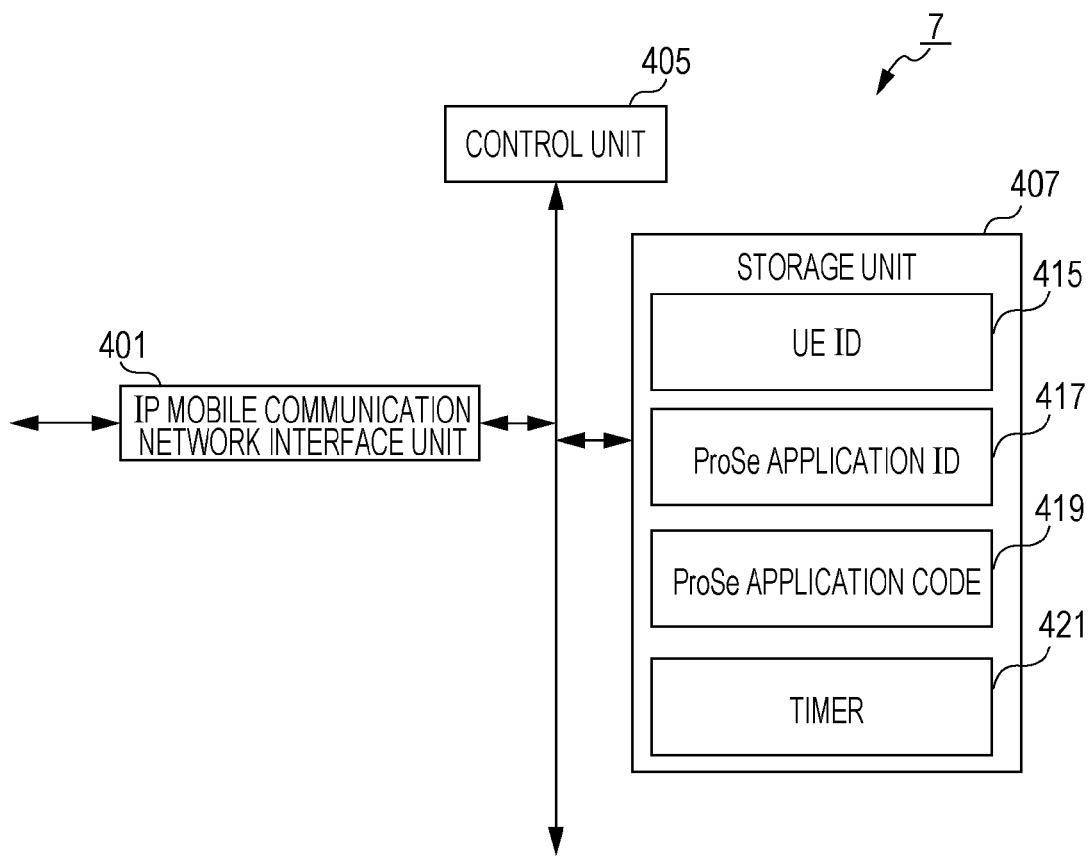
FIG. 4 is a diagram for describing a functional structure of a ProSe server.

FIG. 4 shows a functional structure of the ProSe server 7 according to the present embodiment. The ProSe server 7 is an authentication server which performs proximity detection through ProSe and communication through ProSe and is managed by the mobile communication provider. The ProSe server 7 includes an IP mobile communication network interface unit 401, a control unit 405, and a storage unit 407. The IP mobile communication network interface unit 401 and the storage unit 407 are connected via the control unit 405 through a bus.

The control unit 405 is a functional unit for controlling the ProSe server 7. The control unit 405 is a functional unit which reads various programs stored in the storage unit 407 and executes the read program.

The IP mobile communication network interface unit 401 is a functional unit for allowing the ProSe server 7 to be connected to the IP mobile communication network 3.

The storage unit 407 is a functional unit for storing data or program required in each operation of the ProSe server 7. For example, the storage unit 407 includes a semiconductor memory or a hard disk drive (HDD).

The storage unit 407 may store a UE ID 415, a ProSe application ID 417, a ProSe application code 419 and a timer 421. The ProSe server 7 may store the UE context including these information items.

The UE ID 415 may be identification information for identifying the UE for which the ProSe service is permitted, and may be identification information such as IMSI or MSISDN. Alternatively, the UE ID may be a ProSe ID which is acquired from the ProSe server 7 through a service authentication procedure to be described below and is associated with the UE_A 8.

The ProSe application ID 417 may be identification information used in the ProSe direct discovery that detects the proximity terminal, or may be information for identifying an application executed by a communication terminal that detects the proximity terminal through ProSe. The ProSe application ID may be a specific name of the application.

The ProSe application code 419 may be a code associated with the ProSe application ID. The ProSe application code may be a code which is transmitted while being included in an announcement signal for allowing the proximity terminal to discover the ProSe server or is used to monitor an announcement signal transmitted by the proximity terminal. The more detailed description will be described below, and thus, the description will be omitted now.

The timer 421 may be used to indicate that the ProSe application code can be legitimately used, and may legitimately use the ProSe application code until the timer is expired.

Here, the ProSe server 7 may store the ProSe application ID and the ProSe application code so as to associate this ID with this code.

The ProSe application code 419 and the timer 421 may be stored in association with each other. Alternatively, each UE context may be retained for each UE that is stored in the UE ID 415. Permission information indicating that announcement for allowing the UE to detect the proximity terminal is permitted, and permission information indicating that monitoring for detecting the proximity terminal is permitted may be stored in each UE in association with each UE. The timer may be managed in association with the ProSe application code. The timer for announcement and the timer for monitoring may be retained. As mentioned above, a plurality of timers may be stored for one ProSe application code.

As mentioned above, the ProSe server may store the ProSe application ID 417, and may store the UE authenticates ProSe service registration with the ProSe application ID 417. Here, the terminal that is stored in association with the ProSe application ID 417 may be plural in number. Permission information indicating that announcement for allowing the proximity terminal to discover the UE is permitted and permission information indicating that monitoring for detecting the proximity terminal is permitted may be associated with each UE.

When the monitoring for detecting the proximity terminal is permitted, a discovery filter for monitoring may be stored.

The discovery filter may be managed in association with the ProSe application ID 417, the ProSe application code 419 or the timer 421.

A discovery filter ID for identifying the discovery filter may be stored in addition to the discovery filter.

The discovery filter ID and the discovery filter may be stored in association with each other.

[1.2.3 Structure of HSS]

Figure 5:
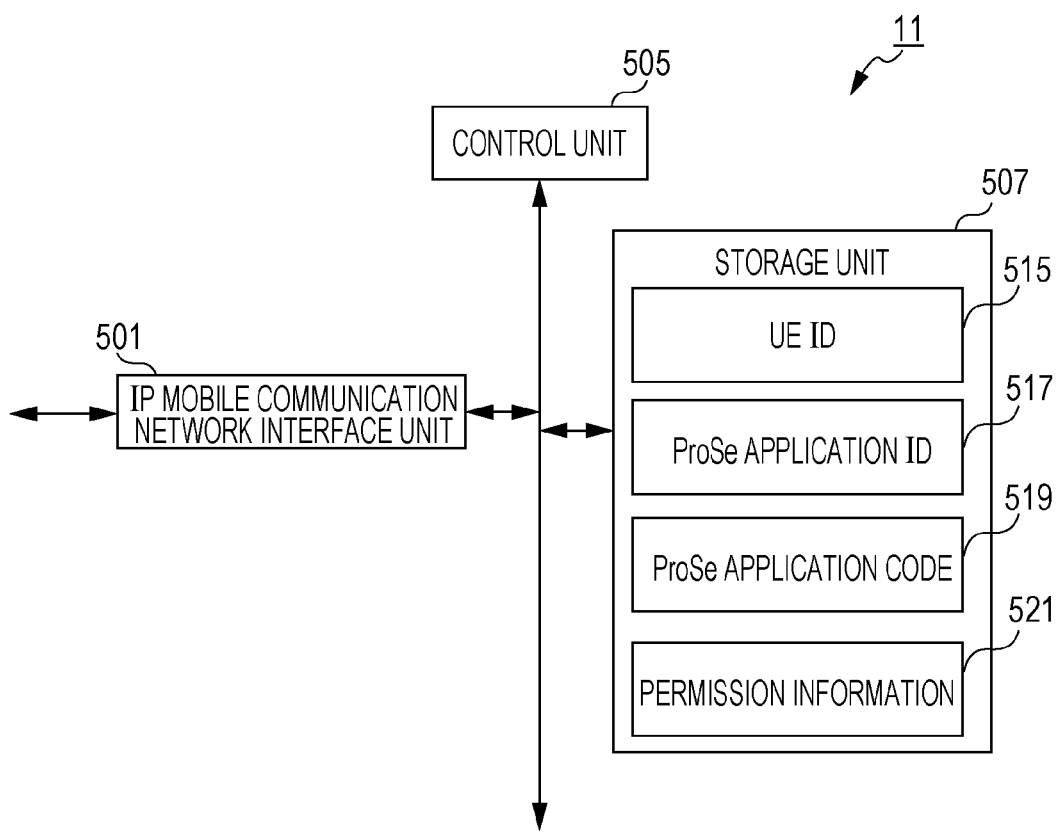
FIG. 5 is a diagram for describing a functional structure of HSS.

FIG. 5 shows a functional structure of the HSS 11 according to the present embodiment. The HSS is a server device that manages subscriber information. The HSS manages permission information for providing services such as communication services including ProSe.

The HSS 11 includes an IP mobile communication network interface unit 501, a control unit 505, and a storage unit 507. The IP mobile communication network interface unit 501 and the storage unit 507 are connected via the control unit 505 through a bus.

The control unit 505 is a functional unit for controlling the HSS 11. The control unit 505 is a functional unit which reads various programs stored in the storage unit 507 and executes the read program.

The IP mobile communication network interface unit 501 is a functional unit for allowing the HSS 11 to be connected to the IP mobile communication network 3.

The storage unit 507 is a functional unit that stores data or program required in various operation of the HSS 11. For example, the storage unit 507 includes a semiconductor memory or a hard disk drive (HDD).

The storage unit 507 may store a UE ID 515, a ProSe application ID 517, a ProSe application code 519 and permission information 521. These information items may be managed as subscriber information for each UE.

The UE ID 515 may be identification information for identifying the UE for which the ProSe service is permitted, and may be identification information such as IMSI or MSISDN. Alternatively, the UE ID may be a ProSe ID which is acquired from the ProSe server 7 through a service authentication procedure to be described below and is associated with the UE_A 8.

The ProSe application ID 517 may be identification information used in the ProSe direct discovery that detects the proximity terminal, or may be identification information for identifying an application executed by a communication terminal that detects the proximity terminal through ProSe. The ProSe application ID may be a specific name of the application.

The ProSe application code 519 may be a code associated with the ProSe application ID 517. The ProSe application code may be a code which is transmitted while being included in an announcement signal for allowing the proximity terminal to discover the HSS or is used to monitor an announcement signal transmitted by the proximity terminal. The more detailed description will be described below, and thus, the description will be omitted now.

The permission information may be permission information indicating whether or not to permit the ProSe service to be provided. The permission information may be permission information indicating whether or not to permit each function such as an announcement function, a monitoring function or a match reporting function among the ProSe services to be provided. The permission information may be managed for each UE.

The permission information may be determined and updated by an operator in an arbitrary timing through the contract of a user.

The HSS 11 may store the ProSe application ID 517 and the ProSe application code 519 so as to associate this ID with this code.

As mentioned above, the HSS may store the ProSe application ID 517, and may store the UE that authenticates ProSe service registration with the ProSe application ID 517. Here, the terminal that is stored in association with the ProSe application ID 517 may be plural in number. Permission information indicating that announcement for allowing the proximity terminal to discover the UE is permitted and permission information indicating that monitoring for detecting the proximity terminal is permitted may be associated with each UE.

When the monitoring for detecting the proximity terminal is permitted, a discovery filter for monitoring may be stored.

The discovery filter may be managed in association with the ProSe application ID 517, the ProSe application code 519 or the timer.

In this case, the timer may be a timer value of an initial configuration configured by an operator.

A discovery filter ID for identifying the discovery filter may be stored in addition to the discovery filter.

The discovery filter ID and the discovery filter may be stored in association with each other.

[1.3 Description of Process]

Hereinafter, the outline of the process described in the present embodiment will be described.

[1.3.1 Service Authentication Procedure]

The UE_A 8 performs an authentication procedure of proximity terminal detection (ProSe Direct Discovery) provided as the ProSe service or communication (ProSe Direct Communication) using a direct communication path. The authentication procedure may be performed by authenticating the proximity terminal detection and the communication using the direct communication path through different procedures, or may be performed by authenticating the proximity terminal detection and the communication using the direct communication path through one authentication procedure.

Figure 6:
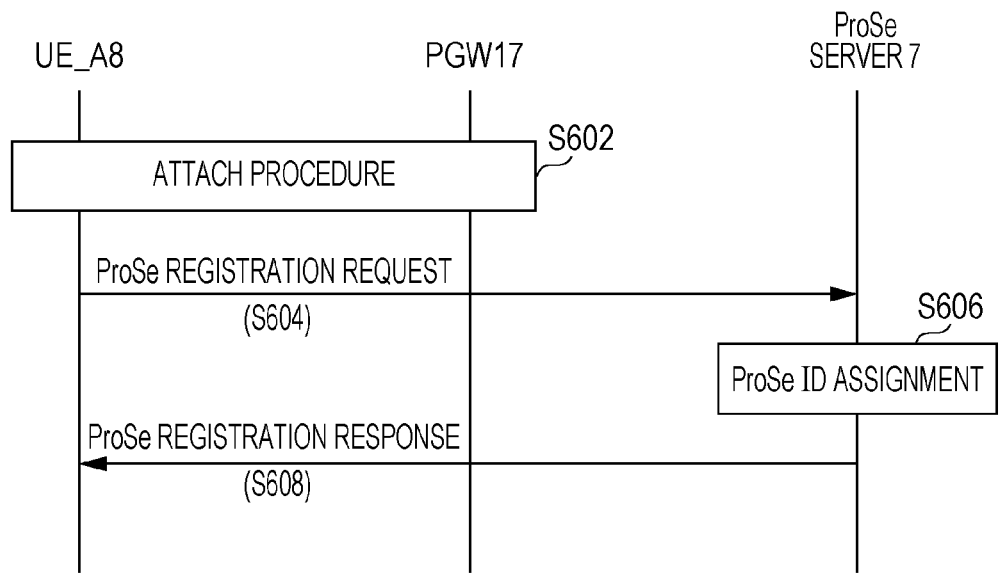
FIG. 6 is a diagram for describing a service authentication procedure.

Hereinafter, the authentication procedure according to the present embodiment will be described with reference to FIG. 6. An example in which the UE_A 8 performs an authentication request will be described below, but the UE_B 9 may perform the authentication procedure by the same method as that of the UE_A 8.

Initially, the UE_A 8 performs an attach procedure, and accesses the core network (S602). As a result, the UE_A 8 establishes PDN connection with the PGW 17. The PDN connection is a communication path for transmitting and receiving data between the PDN 5 and this UE. The attach procedure may be performed as an initial procedure when the UE_A 8 is powered on.

More specifically, the UE_A 8 transmits an attach request to the MME 23, and thus, the attach procedure is started. The attach request including in the identification information of the UE such as APN or IMSIG may be transmitted. The APN may not be necessarily included in an attach request message, and may be notified to the MME 23 from the UE_A 8 by using a control message within the attach procedure.

The MME 23 selects the PGW 17 based on the received APN, and determines an endpoint of the PDN connection for the UE_A 8. The MME establishes the PDN connection or permits the connection to the core network, and transmits an attach permission message as a response to the attach request message to the UE_A 8. The attach permission message may be directly transmitted to the UE_A 8 from the MME 23, or may be transmitted via the eNB 31 included in the LTE AN 25.

The MME 23 may notify that the UE_A 8 is permitted to be connected to the core network by transmitting the attach permission message. The MME 23 may notify that the PDN connection is established by transmitting the attach permission message. The attach permission message including an APN or an IP address associated with the PDN connection may be transmitted.

Subsequently, the UE_A 8 transmits a ProSe registration request message to the ProSe server 7 (S604). The UE_A 8 may request permission for the communication using the direct communication path and the proximity terminal detection by transmitting the ProSe registration request message. This message including information items for respectively identifying the permission for the communication using the direct communication path and the proximity terminal detection may be transmitted, and the permission for the communication using the direct communication path and the permission for the proximity terminal detection may be respectively requested.

The transmission of the ProSe registration request may be performed using the PDN connection established through the attach procedure. The UE_A 8 may transmit the ProSe registration request message to the ProSe server 7 by using the IP address acquired through the attach procedure as a transmission source address.

The ProSe server 7 as a transmission destination of the ProSe registration request message may be used as the transmission destination by previously retaining information of the ProSe server 7 associated with a home PLMN which is a contracted communication provider.

Alternatively, the ProSe server may be used as the transmission destination by retaining a list of communication providers capable of providing the ProSe service as a local PLMN and retaining the ProSe server 7 associated with the local PLMN.

The local PLMN may be any communication provider determined by the contractual relationship with the home PLMN, or may be a communication provider that is operated in the same nation as that of the home PLMN.

As described above, the UE_A 8 may retain a PLMN ID for identifying the PLMN and the ProSe server 7 so as to associate this ID with this server, and may request the authentication using this server as the transmission destination.

The PLMN ID and the information of the ProSe server 7 may be acquired from the home PLMN. The PLMN ID and the information of the ProSe server may be inquired of the ProSe server 7 of the home PLMN, may be acquired from a response to the inquiry, and may be retained.

The ProSe server 7 may perform assignment of the ProSe ID based on the reception of the ProSe registration request (S606). The ProSe server 7 may transmit a ProSe registration response including the ProSe ID to the UE_A 8 (S608). The ProSe ID may be an ID associated with the UE_A 8, and the UE_A 8 may use the ProSe ID as information for identifying the terminal in a case where the detection of the proximity terminal or the presence of this UE is notified to the proximity terminal.

The ProSe server 7 may perform the authentication of the communication using the direct communication path and the detection of the proximity terminal based on the reception of the ProSe registration request, and may transmit the ProSe registration response.

The ProSe registration response including the authentication result may be transmitted. The ProSe server 7 may retain information which is associated with the UE_A 8 and is used for authentication, and may determine whether or not to permit the authentication result based on this information.

The UE_A 8 may receive the ProSe registration response, and may acquire the authentication result. This UE may acquire the ProSe ID included in the ProSe registration response, and may retain the acquired ID.

Although the service registration procedure of the UE_A 8 has been described, the UE_B 9 may perform the service registration through the same procedure.

[1.3.2 Announcement Request Procedure]

Hereinafter, a procedure in which the terminal requests announcement will be described. The announcement means that a terminal notifies another terminal positioned in proximity of the presence of the terminal.

Figure 7:
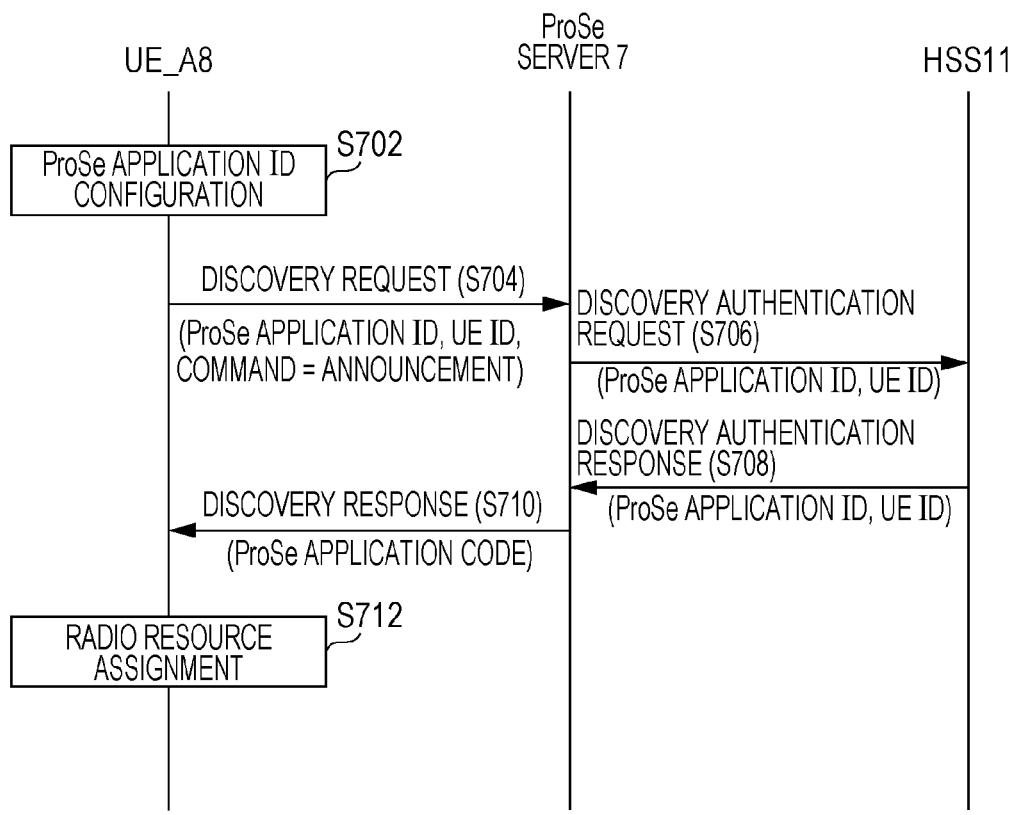
FIG. 7 is a diagram for describing an announcement request procedure.

Hereinafter, a procedure in which the UE_A 8 performs the announcement will be described with reference to FIG. 7. The UE_A 8 may perform the announcement based on the fact that the authentication is permitted through the service authentication procedure.

An example in which the UE_A 8 performs the announcement procedure will be described below, but the UE_B 9 may perform the announcement procedure through the same procedure as that in the UE_A 8.

The UE_A 8 may configure the ProSe application ID corresponding to the home PLMN, as an initial state in which the announcement is performed (S702). As a specific acquisition method, the UE_A 8 may request the ProSe application ID by transmitting the ProSe registration request to the ProSe server 7 in the service registration procedure. The ProSe server 7 may transmit the response including the ProSe application ID. As stated above, the UE_A 8 may acquire the ProSe application ID included in the ProSe registration response.

The UE_A 8 may previously retain the acquired application ID.

The UE_A 8 transmits a discovery request to the ProSe server 7 (S704). Here, the transmission of the discovery request by means of the UE_A 8 may be performed under a condition in which the service authentication procedure is completed. More specifically, the ProSe server 7 of the home PLMN which is the contracted communication provider uses the fact that the announcement of the UE_A 8 is authenticated as a condition. The UE_A 8 may acquire authentication information from the ProSe server 7 in response to the authentication completion, and may use the fact that the authentication information is retained as a condition.

The discovery request including a command indicating that the ProSe application ID, the UE ID or the announcement is requested may be transmitted. The ProSe application ID may be an ID indicating an application for which the UE_A 8 requests the announcement. The UE ID may be identification information such as IMSI or MSISDN. Alternatively, the UE ID may be a ProSe ID which is acquired from the ProSe server 7 through the service authentication procedure and is associated with the UE_A 8.

The information indicating the announcement is requested is not limited to the identification method using the command, and may be requested by defining an announcement request message and transmitting the announcement request message. More specifically, a message type that requests the announcement may be defined, and a request message including the message type may be transmitted.

The ProSe server 7 as the transmission destination of the discovery request may previously retain the information regarding the ProSe server 7 of the home PLMN which is the contracted communication provider of the UE_A 8, and may use the ProSe server 7 of the home PLMN as the transmission destination.

Subsequently, the ProSe server 7 receives the discovery request from the UE_A 8. In a case where the UE context associated with the UE_A 8 is not retained, the ProSe server 7 may request authentication for the announcement to the HSS 11 or authentication for the generation of the UE context (S706). The request for such authentications may be performed by transmitting a discovery authentication request to the HSS 11. The discovery authentication request including the ProSe application ID or the UE ID may be transmitted.

The ProSe application ID may be an ID indicating an application for which the UE_A 8 requests the announcement. The UE ID may be identification information such as IMSI or MSISDN. Alternatively, the UE ID may be a ProSe ID which is acquired from the ProSe server 7 through the service authentication procedure and is associated with the UE_A 8.

Thereafter, the HSS 11 receives the discovery authentication request. The HSS 11 may retain subscriber information associated with the UE_A 8, and may manage the subscriber information so as to associate information indicating that the discovery is permitted, information indicating that the announcement is permitted, or information indicating that the monitoring is permitted with the UE_A 8.

As these permission information items, different permission information items may be managed for applications. That is, the permission information may be managed in association with the ProSe application ID.

The HSS 11 performs the authentication based on the received ProSe application ID or UE ID and the subscriber information. The ProSe server 7 may transmit the discovery authentication response to the ProSe server 7, as a response to the discovery authentication (S708). Here, the discovery authentication response including the authentication result may be transmitted.

More specifically, the information included in the discovery authentication request and the subscriber information may be inquired, and a discovery authentication response including information indicating the announcement is permitted may be transmitted in a case where the UE_A 8 is permitted to perform the announcement, and a discovery authentication response including information indicating that the announcement is not permitted may be transmitted in a case where this UE is not permitted to perform the announcement.

Here, in a case where the information indicating that the announcement is permitted is retained in the subscriber information, the HSS 11 may permit the announcement. In a case where the information indicating that the discovery in ProSe is permitted is retained in the subscriber information, the announcement may be permitted.

Subsequently, the ProSe server 7 receives the discovery authentication response transmitted from the HSS 11. The ProSe server 7 may generate the UE context based on the discovery authentication response. The UE context including the ProSe application ID, the UE ID and the information indicating the announcement is permitted which are acquired by the discovery request transmitted from the UE_A 8 or the discovery authentication response transmitted from the HSS 11 may be stored. Such a UE context may be managed in association with the UE_A 8.

The timer may be managed in association with the ProSe application code. The timer may indicate time when the announcement is permitted. The timer may indicate that the ProSe application code is legitimate. That is, since the ProSe application code needs to be operated to be safely used, a value of the code is not permanently used and is updated by the timer, so that it is possible to ensure safety. An initial value of the timer may be determined depending on a configuration performed by the communication provider.

The ProSe server 7 may retain the ProSe application code corresponding to the ProSe application ID, and may store this ProSe application code in the UE context.

The ProSe application code is a code transmitted while being included in a signal transmitted to allow the communication terminal to discover the proximity terminal, and is associated with the ProSe application ID.

Accordingly, the communication terminal may announce that the corresponding application can be used by transmitting the ProSe application code to the proximity terminal.

The ProSe server 7 may retain the ProSe application code in association with the ProSe application ID. In a case where the ProSe application code is not retained, the ProSe application code may be generated in association with the ProSe application ID.

The ProSe server 7 may transmit the discovery response to the UE_A 8, as a response to the discovery request (S710).

Here, the ProSe server 7 may start to count the timer when the discovery response is transmitted.

The discovery response including information regarding the UE context may be transmitted. More specifically, the discovery response including the ProSe application ID, the UE ID, the ProSe application code, and the value of the timer may be transmitted.

Thereafter, the UE_A 8 receives the discovery response. The authentication result, the ProSe application code and the value of the timer may be acquired.

The UE_A 8 determines whether or not the announcement is permitted based on the information included in the discovery response.

In a case where the announcement is permitted, a radio resource is assigned (S712), and the signal including the acquired ProSe application code may be transmitted to the proximity terminal. Radio resource information such as frequency or time may be acquired from the ProSe server 7, and a resource for announcement may be previously retained and assigned.

The UE_A 8 may start to count the timer based on the reception of the discovery response. The UE_A 8 may transmit a signal for announcement until the timer is expired. In a case where the timer is expired, for example, the value of the timer becomes zero, the announcement is stopped.

In a case where a non-authentication state is notified in the discovery response, the UE_A 8 does not perform the assignment of the radio resource or the announcement.

Through the above-described procedure, the UE_A 8 may perform the authentication procedure for performing the announcement. The UE_A 8 may acquire the ProSe application code corresponding to the ProSe application ID that performs the announcement.

The UE_A 8 may request that a plurality of applications is announced. In this case, this UE may retain a plurality of ProSe application IDs, and may perform an announcement request procedure on each ProSe application ID.

The UE_A 8 may perform the announcement based on the reception of the discovery response in a case where the authentication is performed. As specific announcement means, the UE_A 8 may transmit the announcement signal by using the assigned radio resource. In a state in which the authentication is performed, this UE may transmit the announcement signal in an arbitrary timing by a user operation or a configuration of the communication terminal. The transmission of the announcement signal may be performed by radially transmitting the signals with the UE_A 8 as a center.

The UE_A 8 may determine the strength of a transmission signal based on a range class, and may transmit the signal. The UE_A 8 may acquire the range class from the ProSe server, may retain the acquired range class, may read the range class at the time of transmitting the announcement signal, and may determine the transmission strength. As mentioned above, the UE may determine a reaching distance of the announcement signal.

The UE may retain different range classes for applications as the range class, may determine the transmission strength of the announcement signal for each application based on the range class, and may transmit the announcement signal. The UE_A 8 may transmit the announcement signal by using a direct radio signal based on LTE, that is, an E-UTRA technology.

[1.3.3 Monitoring Request Procedure]

Hereinafter, a procedure in which the terminal requests the monitoring will be described. The monitoring is a procedure for detecting the presence of the proximity terminal. More specifically, the monitoring is a procedure for monitoring the announcement signal in order to receive the announcement signal sent from the proximity terminal.

Figure 8:
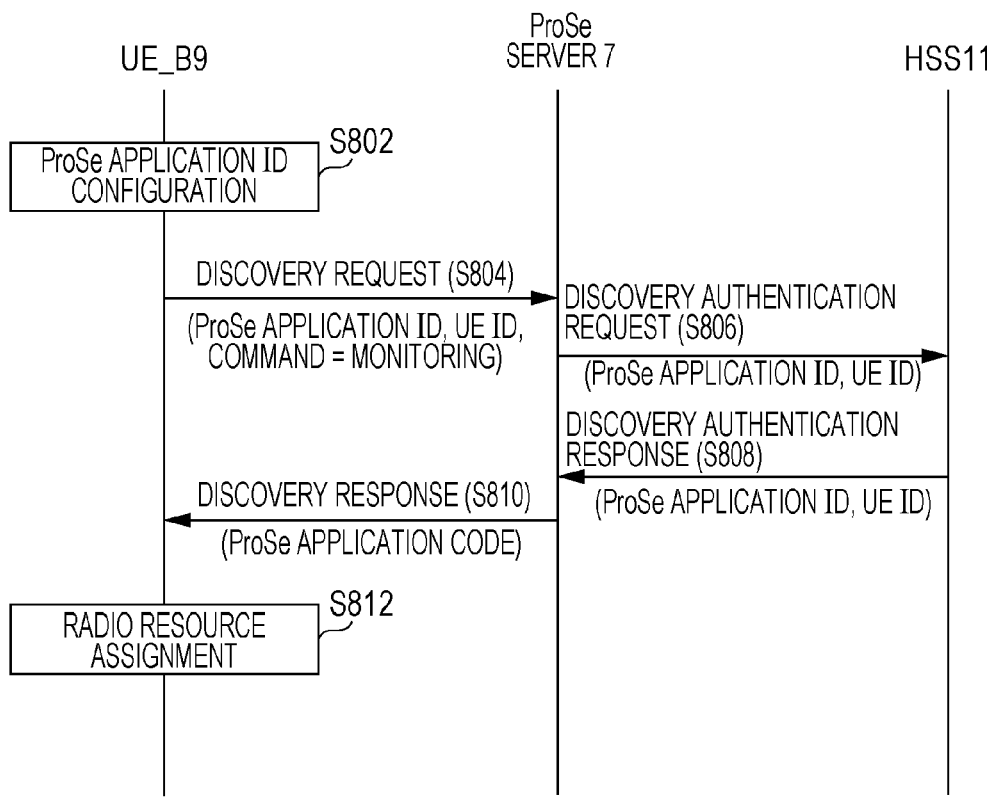
FIG. 8 is a diagram for describing a monitoring request procedure.

Hereinafter, a procedure in which the UE_B 9 performs the monitoring will be described with reference to FIG. 8. The UE_B 9 may perform the monitoring based on the fact that the authentication is permitted through the service authentication procedure.

Hereinafter, an example in which the UE_B 9 performs the announcement procedure will be described below, but the UE_A 8 may perform the monitoring procedure through the same procedure as that of the UE_B 9.

The UE_B 9 may configure the ProSe application ID corresponding to the home PLMN, as an initial state in which the monitoring is performed (S802). As a specific acquisition method, the UE_B 9 may request the ProSe application ID by transmitting the ProSe registration request to the ProSe server 7 in the service registration procedure. The ProSe server 7 may transmit the response including the ProSe application ID. As stated above, the UE_B 9 may acquire the ProSe application ID included in the ProSe registration response.

The UE_A 8 may previously retain the acquired application ID.

The UE_B 9 transmits the discovery request to the ProSe server 7 (S804). Here, the transmission of the discovery request by means of the UE_B 9 may be performed under a condition in which the service authentication procedure is completed. More specifically, in the ProSe server 7 of the home PLMN which is the contracted communication provider, a condition in which the monitoring of the UE_B 9 is authenticated may be used. The UE_B 9 may acquire the authentication information from the ProSe server 7 in response to the authentication completion, and may use a condition in which the authentication information is retained.

The discovery request including the ProSe application ID, the UE ID or the command indicating that the monitoring is request may be transmitted.

The ProSe application ID may be an ID indicating an application for which the UE_B 9 requests the monitoring. The UE ID may be identification information such as IMSI or MSISDN. Alternatively, the UE ID may be a ProSe ID which is acquired from the ProSe server 7 through the service authentication procedure and is associated with the UE_A 8.

The information indicating that the monitoring is requested is not limited to the identification method using the command, and may be requested by defining a monitoring request message and transmitting the monitoring request message. More specifically, a message type that requests the monitoring may be defined, and a request message including the message type may be transmitted.

The ProSe server 7 as the transmission destination of the discovery request may previously retain the information regarding the ProSe server 7 of the home PLMN which is the contracted communication provider of the UE_B 9, and may use the ProSe server 7 of the home PLMN as the transmission destination.

Subsequently, the ProSe server 7 receives the discovery request from the UE_B 9. In a case where the UE context associated with the UE_B 9 is not retained, the ProSe server 7 may request the authentication for the announcement to the HSS 11 or the authentication for the generation of the UE context (S806). The request for such authentications may be performed by transmitting a discovery authentication request to the HSS 11. The discovery authentication request including the ProSe application ID or the UE ID may be transmitted.

The ProSe application ID may be an ID indicating an application for which the UE_B 9 requests the monitoring. The UE ID may be identification information such as IMSI or MSISDN. Alternatively, the UE ID may be a ProSe ID which is acquired from the ProSe server 7 through the service authentication procedure and is associated with the UE_B 9.

Thereafter, the HSS 11 receives the discovery authentication request. The HSS 11 may retain the subscriber information associated with the UE_B 9, and may manage the subscriber information by associating information indicating that the discovery is permitted, information indicating that the monitoring is permitted, or information indicating that the announcement is permitted with the UE_B 9.

As these permission information items, different permission information items may be managed for applications. That is, the permission information may be managed in association with the ProSe application ID.

The HSS 11 performs the authentication based on the received ProSe application ID or UE ID and the subscriber information. The ProSe server 7 may transmit the discovery authentication response to the ProSe server 7, as a response to the discovery authentication (S808). Here, the discovery authentication response including the authentication result may be transmitted.

More specifically, the information included in the discovery authentication request and the subscriber information may be inquired, the discovery authentication response including the information indicating that the monitoring is permitted may be transmitted in a case where the UE_B 9 is permitted to perform the monitoring, and the discovery authentication response including the information indicating that the monitoring is not permitted may be transmitted in a case where this UE is not permitted to perform the monitoring.

Here, in a case where the information indicating that the monitoring is permitted is retained in the subscriber information, the HSS 11 may permit the monitoring. In a case where the information indicating that the discovery in the ProSe is permitted is retained in the subscriber information, the monitoring may be permitted.

Subsequently, the ProSe server 7 receives the discovery authentication response transmitted from the HSS 11. The ProSe server 7 may generate the UE context based on the discovery authentication response. The UE context including the ProSe application ID, the UE ID and the information indicating that the monitoring is permitted which are acquired by the discovery request transmitted from the UE_A 8 or the discovery authentication response transmitted from the HSS 11 may be stored. The UE context may be managed in association with the UE_B 9.

The timer may be managed in association with the ProSe application code. The timer may indicate time when the announcement is permitted. The timer may indicate that the ProSe application code is legitimate. That is, since the ProSe application code needs to be operated to be safely used, a value of the code is not permanently used and is updated by the timer, so that it is possible to ensure safety.

An initial value of the timer may be determined depending on a configuration performed by the communication provider. In a case where another terminal such as the UE_A 8 requests the announcement and the ProSe server 7 assigns the ProSe application code corresponding to the ProSe application ID, the timer associated with the ProSe application code may be counted, and a remaining value at a current point of time may be used as the initial value.

The ProSe server 7 may retain the ProSe application code corresponding to the ProSe application ID, and may store this application in the UE context.

The ProSe application code is a code transmitted while being included in a signal transmitted to allow the communication terminal to discover the proximity terminal, and is associated with the ProSe application ID.

Accordingly, the communication terminal can use the corresponding application by transmitting the ProSe application code to the proximity terminal, and can monitor the terminal that performs the announcement.

The ProSe server 7 may retain the ProSe application code in association with the ProSe application ID. In a case where the ProSe application code is not retained, the ProSe application code may be generated in association with the ProSe application ID.

The ProSe server 7 may transmit the discovery response to the UE_B 9, as a response to the discovery request (S810).

Here, the ProSe server 7 may start to count the timer when the discovery response is transmitted.

The discovery response including information regarding the UE context may be transmitted. More specifically, the discovery response including the ProSe application ID, the UE ID, the ProSe application code, and the value of the timer may be transmitted.

Here, in a case where another terminal such as the UE_A 8 requests the announcement and the ProSe server 7 assigns the ProSe application code corresponding to the ProSe application ID, the timer associated with the ProSe application code is counted. The ProSe server 7 may transmit a remaining value at a current point of time, as the value of the timer.

The ProSe server 7 may transmit a mask value for masking a part of the ProSe application code without transmitting the ProSe application code. For example, there are coffee shops or restaurants developed to multiple stores, and the ProSe application code is associated with a specific store, and thus, the mask value is not able to specify the specific store but is able to specify a company that has chain stores, such as a name of the coffee shop.

When a plurality of Prose application IDs is managed as a group and the ProSe application code is generated for each ProSe application ID, the same value may be assigned to an arbitrary high-order bit of the ProSe application code. Such a common high-order bit may be used as the mask value. Accordingly, the UE that performs the monitoring can detect the plurality of Prose application codes managed by the group based on the detection using the mask value. As stated above, it is possible to detect the plurality of ProSe applications.

As stated above, the mask may be identification information capable of identifying the plurality of ProSe application IDs.

The ProSe server 7 may manage the ProSe application code or the mask value managed in association with the ProSe application ID and the timer defined as the discovery filter. That is, the ProSe server 7 may transmit the discovery response to the UE_B 9, and may the discovery response including the discovery filter corresponding to the ProSe application ID for which the UE_B 9 requests the monitoring. The ProSe server may transmit the discovery response including the discovery filter ID for identifying the discovery filter.

Subsequently, the UE_B 9 receives the discovery response. The authentication result, the ProSe application code and the value of the timer may be acquired.

The UE_B 9 determines whether or not the monitoring is permitted based on the information included in the discovery response.

In a case where the monitoring is permitted, the radio resource is assigned (S812), and this UE may monitor whether or not the signal including the acquired ProSe application code may be transmitted. Radio resource information such as frequency or time may be acquired from the ProSe server 7, and a resource for announcement may be previously retained and assigned. In the monitoring, the UE_B 9 may receive and detect the announcement signal transmitted using a direct radio signal based on LTE, that is, an E-UTRA technology.

The UE_A 8 may start to count the timer based on the reception of the discovery response. The UE_B 9 may perform the monitoring until the timer is expired. In a case where the timer is expired, for example, the value of the timer becomes zero, the monitoring is stopped.

In a case where a non-authentication state is notified in the discovery response, the UE_B 9 does not perform the assignment or the monitoring of the radio resource.

Through the above-described procedure, the UE_B 9 may perform the authentication procedure for performing the monitoring. The UE_B 9 may acquire the ProSe application code corresponding to the ProSe application ID that performs the monitoring.

The UE_B 9 may request the monitoring of the plurality of applications. In this case, this UE may retain a plurality of ProSe application IDs, and may perform a monitoring request procedure on each ProSe application ID.

[1.3.4 Match Reporting Procedure]

Hereinafter, a match reporting procedure performed by the terminal will be described. The match reporting is a procedure in which the terminal reports the monitoring result to the ProSe server 7 when the ProSe application code announced by the proximity terminal is received through the monitoring. In the match reporting procedure, the ProSe application ID associated with the received ProSe application code or the timer value associated with the ProSe application code may be acquired.

Figure 9:
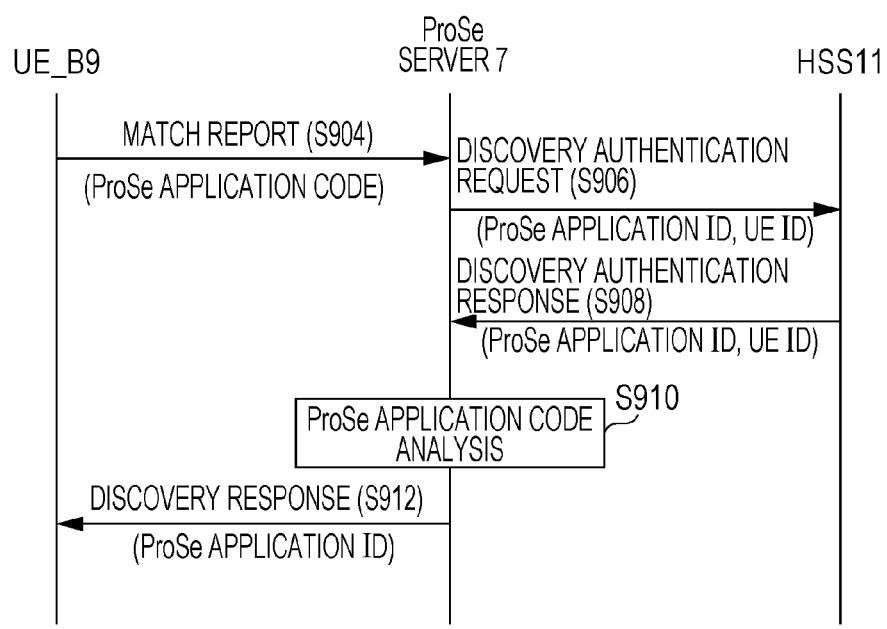
FIG. 9 is a diagram for describing a match reporting procedure.

Hereinafter, a procedure in which the UE_B 9 performs the match reporting will be described with reference to FIG. 9. The UE_B 9 may perform the announcement based on the fact that the authentication is permitted through the service authentication procedure.

An example in which the UE_B 9 performs the match reporting procedure will be described below, but the UE_A 8 may perform the match reporting procedure through the same procedure as that of the UE_B 9.

The UE_B 9 may retain the ProSe application ID corresponding to the home PLMN, as an initial state in which the match reporting is performed. As a specific acquisition method, the UE_A 8 may request the ProSe application ID by transmitting the ProSe registration request to the ProSe server 7 in the service registration procedure. The ProSe server 7 may transmit the response including the ProSe application ID. As stated above, the UE_A 8 may acquire the ProSe application ID included in the ProSe registration response.

Alternatively, the UE may not retain the ProSe application ID. The UE may acquire the ProSe application code through the monitoring, may detect that the ProSe application ID corresponding to the acquired ProSe application code is not retained, and may start the match reporting procedure based on the detection.

Specifically, the starting of the match reporting procedure means that the UE_B 9 transmits a match report request to the ProSe server 7 (S904).

Here, the transmission of the match report request by means of the UE_B 9 may be performed under a condition in which the service authentication procedure is completed. More specifically, in the ProSe server 7 of the home PLMN which is the contracted communication provider, a condition in which the monitoring of the UE_B 9 is authenticated may be used. Alternatively, a condition in which the monitoring is authenticated based on information indicating whether or not the execution of the match reporting is permitted in addition to the monitoring may be used. The UE_B 9 may acquire the authentication information from the ProSe server 7 in response to the authentication completion, and may use a condition in which the authentication information is retained.

The match report request including a command indicating that the ProSe application code, the UE ID or the match report is requested may be transmitted.

The UE ID may be identification information such as IMSI or MSISDN. Alternatively, the UE ID may be a ProSe ID which is acquired from the ProSe server 7 through the service authentication procedure and is associated with the UE_B 9.

The information indicating that the match report is requested is not limited to the identification method using the command, and may be requested by defining a match report request message and transmitting the match report request message. More specifically, a message type that requests the match report may be defined, and a request message including the message type may be transmitted.

The ProSe server 7 as the transmission destination of the match report request may previously retain the information regarding the ProSe server 7 of the home PLMN which is the contracted communication provider of the UE_B 9, and may use the ProSe server 7 of the home PLMN as the transmission destination.

Subsequently, the ProSe server 7 receives the match report request from the UE_B 9. In a case where the UE context associated with the UE_B 9 is not retained, the ProSe server 7 may request the authentication for the announcement to the HSS 11, the authentication for the monitoring or the authentication for the generation of the UE context (S906). The request for such authentications may be performed by transmitting a discovery authentication request to the HSS 11. The discovery authentication request including the UE ID may be transmitted.

The UE ID may be identification information such as IMSI or MSISDN. Alternatively, the UE ID may be a ProSe ID which is acquired from the ProSe server 7 through the service authentication procedure and is associated with the UE_B 9.

Thereafter, the HSS 11 receives the discovery authentication request. The HSS 11 may retain the subscriber information associated with the UE_B 9, and may manage the subscriber information by associating information indicating that the discovery is permitted, information indicating that the announcement is permitted, information indicating that the monitoring is permitted, or information indicating that the match reporting is permitted with the UE_B 9.

As these permission information items, different permission information items may be managed for applications. That is, the permission information may be managed in association with the ProSe application ID.

The HSS 11 performs the authentication based on the received UE ID and the subscriber information. The ProSe server 7 stay transmit the discovery authentication response to the ProSe server 7, as a response to the discovery authentication (S908). Here, the discovery authentication response including the authentication result may be transmitted.

More specifically, the information included in the discovery authentication request and the subscriber information may be inquired, the discovery authentication response including the information indicating that the match reporting is permitted may be transmitted in a case where the UE_B 9 is permitted to perform the monitoring, and the discovery authentication response including the information indicating that the monitoring is not permitted may be transmitted in a case where this UE is not permitted to perform the monitoring.

Here, in a case where the information indicating that the match reporting is permitted is retained in the subscriber information, the HSS 11 may permit the match report. In a case where the information indicating that the monitoring is permitted is retained in the subscriber information, the match reporting may be permitted. In a case where the information indicating that the discovery in the ProSe is permitted is retained in the subscriber information, the match reporting may be permitted.

Subsequently, the ProSe server 7 receives the discovery authentication response transmitted from the HSS 11. The ProSe server 7 may generate the UE context based on the discovery authentication response. The UE context including the UE ID and the information indicating that the announcement is permitted or the information indicating that the monitoring is permitted which are acquired by the match report request transmitted from the UE_B 9 or the discovery authentication response transmitted from the HSS 11 may be stored. The UE context may be managed in association with the UE_B 9.

The ProSe server 7 analyzes the ProSe application code transmitted while being included in the match report from the UE_B 9 (S910). Specifically, the ProSe server determines the ProSe application ID corresponding to the ProSe application code.

Here, the ProSe server 7 may previously acquire the ProSe application ID corresponding to the ProSe application code, and may store the acquired ID. The ProSe server 7 may previously manage the ProSe application code and the ProSe application ID so as to associate this code with this ID when the ProSe application is generated.

For example, in the announcement request procedure by means of the UE_A 8, in a case where the UE_A 8 generates the ProSe application code in association with the ProSe application to be transmitted, the ProSe application ID and the ProSe application code may be stored in association with each other. This UE may receive the match report from the UE_B 9, and may select the ID corresponding to the ProSe application code from the stored ProSe application IDs based on the ProSe application code included in the match report.

The timer may be managed in association with the ProSe application code. The timer may indicate time when the announcement is permitted. The timer may indicate that the ProSe application code is legitimate. That is, since the ProSe application code needs to be operated to be safely used, a value of the code is not permanently used and is updated by the timer, so that it is possible to ensure safety. An initial value of the timer may be determined depending on a configuration performed by the communication provider.

The ProSe server 7 may transmit a match report response to the UE_B 9, as a response to the match report request (S912).

Here, the ProSe server 7 may start to count the timer when the match report response is transmitted.

The match report response including the information related to the UE context may be transmitted. More specifically, the discovery response including the ProSe application ID, the UE ID, the ProSe application code, and the value of the timer may be transmitted.

Thereafter, the UE_B 9 receives the match report response. The authentication result, the ProSe application ID and the value of the timer may be acquired.

The UE_B 9 receives the match report response, and normally completes the monitoring of the ProSe application code.

The UE_B 9 may start to count the timer included in the match report response based on the reception of the match report response. The UE_B 9 recognizes that the monitored ProSe application code can be normally used until the timer is expired. In a case where the timer is expired, for example, the value of the timer becomes zero, the monitoring is stopped.

Through the above-described procedure, the UE_B 9 may determine the ProSe application ID corresponding to the monitored ProSe application code, and may specify the application. For example, in a case where the UE_A 8 announces the ProSe application code and the UE ID and the UE_B 9 performs the monitoring to receive the ProSe application code and the UE ID for identifying the UE_A 8, the UE_B 9 may detect that the UE_A 8 is positioned in proximity and there is an application capable of being used by the UE_A 8 by performing the match reporting procedure.

[1.3.5 Revocation Procedure of ProSe Application Code]

The terminal may perform the announcement through the announcement request procedure described in 1.3.2.

In 1.3.2, the example in which the UE_A 8 transmits the announcement request including the ProSe application ID to the ProSe server 7 and receives the response to the announcement request has been described. The UE_A 8 acquires the application code corresponding to the ProSe application ID and the timer capable of managing the timer when the application code can be normally used by receiving the response.

The UE_A 8 may perform the counting of the timer, may transmit the announcement signal including the ProSe application code until the timer is expired, and may notify the proximity terminal that this UE is presented and the application identified by the ProSe application ID associated with the ProSe application code can be used.

The terminal which is positioned in the reaching range of the announcement signal of the UE_A 8 and performs the monitoring may receive the announcement signal and may detect that the UE_A 8 is positioned in proximity.

As stated above, the UE_A 8 may continue to announce the ProSe application code until the timer is expired. The UE_A 8 may stop the announcement based on the configuration of the terminal or the user operation until the timer is expired.

The terminal may perform the monitoring through the monitoring request procedure described in 1.3.3.

In 1.3.3, the example in which the UE_B 9 transmits the monitoring request including the ProSe application ID to the ProSe server 7 and receives the response to the monitoring request has been described. The UE_B 9 acquires the application code corresponding to the ProSe application ID and the timer capable of managing the timer when the application code can be normally used by receiving the response.

In a case where, the UE_B 9 performs the counting of the timer, monitors the ProSe application code until the timer is expired, and is positioned in the reaching range of the signal announced by the proximity terminal, this UE may receive the announcement signal, may detect the terminal that performs the announcement, and may detect that the application identified by the ProSe application ID associated with the ProSe application code can be used.

As stated above, the UE_B 9 may continue to monitor the ProSe application code until the timer is expired. The UE_B 9 may stop the monitoring based on the configuration of the terminal or the user operation until the timer is expired.

Through the match reporting procedure described in 1.3.4, the terminal can manage the timer associated with the ProSe application code, and may manage an expiration date of the ProSe application.

Figure 10:
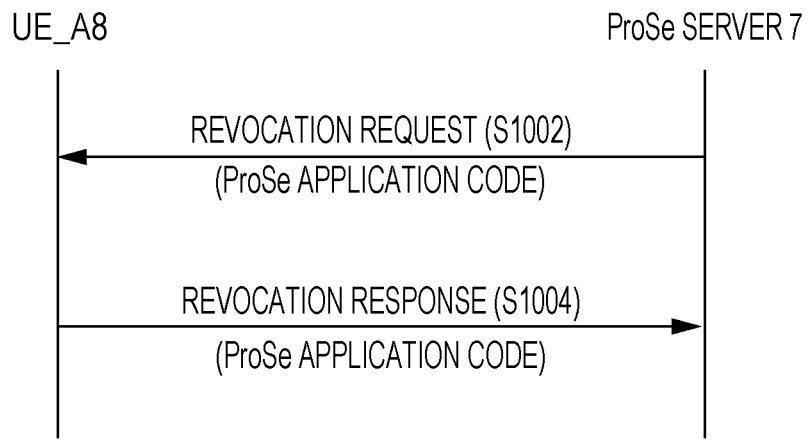
FIG. 10 is a diagram for describing a revocation request procedure.

Hereinafter, a revocation procedure in which the communication provider actively invalidates the ProSe application code will be described with reference to FIG. 10.

In an initial state, the UE_A 8 performs the announcement request procedure, and retains the ProSe application code in association with the ProSe application ID. The UE performs the counting of the timer corresponding to the ProSe application code, and sets the timer so as not to be expired.

In contrast, the ProSe server 7 generates the UE context for the UE_A 8, retains the generated context, and retains the ProSe application ID in association with the UE ID. The ProSe server assigns the ProSe application code corresponding to the ProSe application ID, and retains the assigned code. The ProSe server counts the timer corresponding to the ProSe application code, and sets the timer so as not to be expired.

In order to stop the announcement of the UE_A 8 that is already permitted for the announcement based on the policy of the mobile communication provider, the ProSe server 7 transmits a revocation request to the UE_A 8 (S1002).

The revocation request including the ProSe application code and the UE ID for identifying the UE_A 8 may be transmitted. The UE ID may be identification information such as IMSI or MSISDN.

The revocation request including a command indicating that the ProSe application code is invalidated may be transmitted. The information indicating that the invalidation of the ProSe application code is requested is not limited to the identification method using the command, and may be requested by defining a revocation request message and transmitting the revocation request message. More specifically, a message type of the request message may be defined, and a request message including the message type may be transmitted.

The information which indicates that the ProSe application code is invalidated and includes the value of the timer may be transmitted by setting the value of the timer corresponding to the ProSe application code to be zero. Accordingly, the UE_A 8 that receives this information stops the announcement since the value of the timer of the ProSe application code becomes zero.

The ProSe server 7 may invalidate the ProSe application code corresponding to a specific application based on the policy of the communication provider.

For example, the communication provider may determine an application that stops the announcement, the monitoring or the execution of the match report, may check the ProSe application ID corresponding to the application, may select all the UEs which notify of the ProSe application code corresponding to the ProSe application ID and permit the ProSe application ID from the UE context, and may transmit the revocation request to all the UEs including the UE_A 8 which notify of the ProSe application code.

Accordingly, the UE that receives the revocation request invalidates the ProSe application code.

In a case where the announcement is performed, the announcement is stopped. For example, the UE_A 8 receives the revocation request, and stops the announcement corresponding to the ProSe application code included in the revocation request.

More specifically, a resource for the announcement is released. The counting of the timer is stopped. The transmission of the announcement signal is stopped.

As stated above, the ProSe server 7 may request that the UE_A 8 invalidates the ProSe application code by a trigger on a network side based on the policy of the communication provider. The ProSe server requests that the ProSe application code is invalidated, and thus, the ProSe server can request that the announcement is stopped. The ProSe server 7 may request that a resource for transmitting the announcement signal is released by transmitting the revocation request. The ProSe server may request that the counting of the timer is stopped. The ProSe server may request that the transmission of the announcement signal is stopped.

The UE_A 8 may transmit a response to a revocation stop request to the ProSe server 7 based on the invalidation of the ProSe application or the stopping of the announcement, and may notify that the invalidation of the ProSe application code is completed (S1004). Through the notification, the UE may notify that the stopping of the announcement is completed. The response including the UE ID or the ProSe application code may be transmitted.

The ProSe server 7 may receive the response transmitted from the UE_A 8, and may check that the invalidation of the ProSe application code or the stopping of the announcement is completed.

In a case where the UE that receives the revocation request performs the monitoring, the ProSe server stops the monitoring.

For example, the UE_B 9 receives the revocation request, and stops the monitoring corresponding to the ProSe application code included in the revocation request.

More specifically, a resource for the monitoring is released. The counting of the timer is stopped. The reception of the announcement signal is stopped.

As stated above, the ProSe server 7 may request that the UE_B 9 invalidates the ProSe application code by a trigger on a network side based on the policy of the communication provider. The ProSe server requests that the ProSe application code is invalidated, and thus, the ProSe server may request that the monitoring is stopped. The ProSe server 7 may request that a resource for receiving the monitoring signal is released by transmitting the revocation request. The ProSe server may request that the counting of the timer is stopped. The ProSe server may request that the reception of the announcement signal is stopped.

The UE_B 9 may transmit the response to the revocation request to the ProSe server 7 based on the invalidation of the ProSe application code or based on the stopping of the monitoring, and may notify that the invalidation of the ProSe application code is completed. Through the notification, the UE may notify that the stopping of the announcement is completed. The response including the UE ID or the ProSe application code may be transmitted.

The ProSe server 7 may receive the response transmitted from the UE_B 9, and may check that the invalidation of the ProSe application code or the stopping of the monitoring is completed.

The UE that receives the revocation request may perform the match reporting procedure, and may destroy the information of the detected proximity terminal in a case where the proximity terminal is detected.

For example, the UE_B 9 may receive the revocation request, and may destroy the information that manages the UE_A 8 as the proximity terminal in a case where the UE_A 8 is detected as the proximity terminal based on the ProSe application code included in the revocation request.

As stated above, the ProSe server 7 may request that the UE_B 9 invalidates the ProSe application code by a trigger on a network side based on the policy of the communication provider. The ProSe server requests that the ProSe application code is invalidated, and thus, the ProSe server may request that information related to the proximity terminal detected based on the ProSe application code is destroyed. The ProSe server may request that the counting of the timer is stopped.

The UE_B 9 may transmit the response to the revocation request to the ProSe server 7 based on the invalidation of the ProSe application code, and may notify that the invalidation of the ProSe application code is completed. Through the notification, the UE may notify that the information related to the detected proximity terminal is destroyed. The response including the UE ID or the ProSe application code may be transmitted.

As stated above, the ProSe server 7 may receive the response transmitted from the UE_B 9, and may check that the ProSe application code is invalidated or information related to the proximity terminal is destroyed.

As described above, the network can actively invalidate the ProSe application code based on the policy of the communication provider. Accordingly, the ProSe server may request that the UE that performs the announcement stops the announcement. The ProSe server may request that the UE that performs the monitoring stops the monitoring. The UE that performs the match reporting procedure may be requested to destroy the information related to the detected proximity terminal.

The ProSe application code is information which is assigned to the terminal authenticated by an in-network device of the communication provider, such as the ProSe server 7 and has high confidentiality which is required to prevent illegitimate acquisition or falsification by a third party. The procedure in which the communication provider actively stops the announcement through the detection of any risk even though the ProSe application code notified to the UE is within the expiration date has been described above. Accordingly, it is possible to improve the safety of the ProSe application code.

Although the example in which the ProSe server 7 transmits the revocation request including the ProSe application code has been described in the above-described procedure, the present invention is not limited to this example, and the ProSe server may transmit not the ProSe application code but a mask value. The mask value may be a value of an arbitrary high-order bit common to the plurality of ProSe application codes.

The UE_B 9 receives the revocation request, and acquires the mask included in the revocation request. The plurality of ProSe application codes of which the mask value and the high-order bit match may be detected, and the detected codes may be invalidated as revocation request targets.

As mentioned above, the ProSe server transmits the mask, and thus, the ProSe server may invalidate the plurality of ProSe application codes identified based on the mask. The UE_B 9 may receive the mask transmitted from the ProSe server, and may invalidate the plurality of ProSe application codes identified based on the mask. A process that comes with the invalidation of the ProSe application code such as the resource release, the stopping of the announcement signal transmission or the stopping of the monitoring is the same as the method already described when the ProSe application code is received and invalidated, and thus, the detailed description thereof will be omitted.

[1.3.6 Update Procedure of ProSe Application Code]

The terminal may perform the announcement through the announcement request procedure described in 1.3.2.

In 1.3.2, the example in which the UE_A 8 transmits the announcement request including the ProSe application ID to the ProSe server 7 and receives the response to the announcement request has been described. The UE_A 8 acquires the application code corresponding to the ProSe application ID and the timer capable of managing the timer when the application code can foe normally used by receiving the response.

The UE_A 8 may perform the counting of the timer, may transmit the announcement signal including the ProSe application code until the timer is expired, and may notify the proximity terminal that this UE is presented and the application identified by the ProSe application ID associated with the ProSe application code can be used.

The terminal which is positioned in the reaching range of the announcement signal of the UE_A 8 and performs the monitoring may receive the announcement signal and may detect that the UE_A 8 is positioned in proximity.

As stated above, the UE_A 8 may continue to announce the ProSe application code until the timer is expired. The UE_A 8 may stop the announcement based on the configuration of the terminal or the user operation until the timer is expired.

The terminal may perform the monitoring through the monitoring request procedure described in 1.3.3.

In 1.3.3, the example in which the UE_B 9 transmits the monitoring request including the ProSe application ID to the ProSe server 7 and receives the response to the monitoring request has been described. The UE_B 9 acquires the application code corresponding to the ProSe application ID and the timer capable of managing the timer when the application code can be normally used by receiving the response.

In a case where, the UE_B 9 performs the counting of the timer, monitors the ProSe application code until the timer is expired, and is positioned in the reaching range of the signal announced by the proximity terminal, this UE may receive the announcement signal, may detect the terminal that performs the announcement, and may detect that the application identified by the ProSe application ID associated with the ProSe application code can be used.

As stated above, the UE_B 9 may continue to monitor the ProSe application code until the timer is expired. The UE_B 9 may stop the monitoring based on the configuration of the terminal or the user operation until the timer is expired.

Through the match reporting procedure described in 1.3.4, the terminal can manage the timer associated with the ProSe application code, and may manage an expiration date of the ProSe application.

Figure 11:
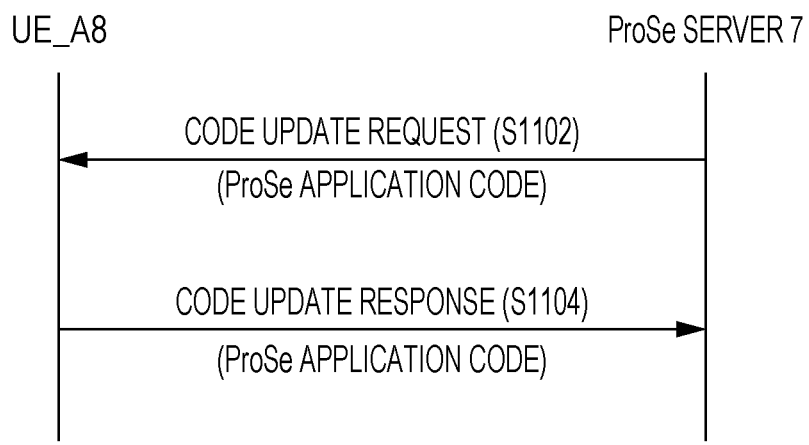
FIG. 11 is a diagram for describing a code update request procedure.

Hereinafter, a procedure in which the communication provider actively updates the ProSe application code will be described with reference to FIG. 11.

In an initial state, the UE_A 8 performs the announcement request procedure, and retains the ProSe application code in association with the ProSe application ID. The UE performs the counting of the timer corresponding to the ProSe application code, and sets the timer so as not to be expired.

In contrast, the ProSe server 7 generates the UE context for the UE_A 8, retains the generated context, and retains the ProSe application ID in association with the UE ID. The ProSe server assigns the ProSe application code corresponding to the ProSe application ID, and retains the assigned code. The ProSe server counts the timer corresponding to the ProSe application code, and sets the timer so as not to be expired.

In order to update the ProSe application code of the UE_A 8 that is already permitted for the announcement based on the policy of the mobile communication provider to a code different from the past code, the ProSe server 7 transmits a code update request to the UE_A 8 (S1102).

The code update request including the UE ID for identifying the UE_A 8, an old ProSe application code and a new ProSe application code may be transmitted. The UE ID may be identification information such as IMSI or MSISDN.

The code update request including a command indicating that the ProSe application code is invalidated may be transmitted. The information indicating that the updating of the ProSe application code is requested is not limited to the identification method using the command, and may be requested by defining a code update request message and transmitting the code update request message. More specifically, a message type of the request message may be defined, and a request message including the message type may be transmitted.

The information which indicates that the updating of the ProSe application code is requested and includes the value of the timer may be transmitted by setting the value of the timer corresponding to the ProSe application code to be zero. Accordingly, the UE_A 8 that receives this information stops the announcement since the value of the timer of the ProSe application code becomes zero.

The information including a timer corresponding to the new ProSe application code may be transmitted.

The ProSe server 7 may update the ProSe application code corresponding to the specific application based on the policy of the communication provider.

More specifically, the communication provider may determine an application that stops the announcement, the monitoring or the execution of the match report, may check the ProSe application ID corresponding to the application, may select all the UEs that notify the ProSe application code corresponding to the ProSe application ID from the UE context, and may transmit the code update request to all the UEs including the UE_A 8 which notify the ProSe application code.

Accordingly, the UE that receives the code update request updates the old ProSe application code to the ProSe application code.

In a case where the announcement is performed, a signal including the updated ProSe application code may be transmitted to the proximity, and the announcement may be performed. Radio resource information such as frequency or time may be acquired from the ProSe server 7, and a resource for announcement may be previously retained and assigned.

As state above, the ProSe server 7 may request that the UE_A 8 updates the ProSe application code by a trigger on a network side based on the policy of the communication provider.

The UE_A 8 may transmit the response to the code update request to the ProSe server 7 based on the updating of the ProSe application code, and may notify that the updating of the ProSe application code is completed (S1104). The response including the UE ID or the ProSe application code may be transmitted.

The ProSe server 7 may receive the response transmitted from the UE_A 8, and may check that the updating of the ProSe application code is completed.

In a case where the UE that receives the revocation request performs the monitoring, the ProSe application code is updated, and the monitoring is performed.

For example, the UE_B 9 receives the code update request, updates the ProSe application code which corresponds to the ProSe application code included in the code update request and is used for the monitoring to the new ProSe application code, and continues the monitoring.

As state above, the ProSe server 7 may request that the UE_B 9 updates the ProSe application code by a trigger on a network side based on the policy of the communication provider. The UE_B 9 may transmit the response to the code update request to the ProSe server 7 based on the updating of the ProSe application code, and may notify that the updating of the ProSe application code is completed. The response including the UE ID or the ProSe application code may be transmitted.

The ProSe server 7 may receive the response transmitted from the UE_B 9, and may check that the ProSe application code is updated.

As described above, the network can actively update the ProSe application code based on the policy of the communication provider.

The ProSe application code is information which is assigned to the terminal authenticated by an in-network device of the communication provider, such as the ProSe server 7 and has high confidentiality which is required to prevent illegitimate acquisition or falsification by a third party. The communication provider actively updates the ProSe application code through the detection of any risk even though the ProSe application code notified to the UE is within the expiration date, and thus, it is possible to improve safety.

[1.3.7 ProSe Application Code Re-Acquisition Request Procedure]

The method in which the ProSe server 7 actively updates the ProSe application code is not limited to the ProSe application code update procedure described in 1.3.6, and another method may be used.

Figure 12:
FIG. 12 is a diagram for describing a code re-acquisition request procedure.

For example, as shown in FIG. 12, procedure in which the ProSe server requests the re-acquisition of the ProSe application code may be used.

More specifically, the ProSe server 7 transmits a code re-acquisition request to the UE_A 8. The code re-acquisition request including the ProSe application code may be transmitted. The ProSe server 7 may request the re-acquisition of the ProSe application code by transmitting the code re-acquisition request.

The code re-acquisition request including a command indicating that the re-acquisition of the ProSe application code is requested may be transmitted. The information indicating that the updating of the ProSe application code is requested is not limited to the identification method using the command, and may be requested by defining a code re-acquisition request message and transmitting the code re-acquisition request message. More specifically, a message type of the request message may be defined, and a request message including the message type may be transmitted.

In FIG. 12, an example in which the code re-acquisition request is transmitted to the UE_A 8 will be described, but the present invention is not limited to this example, and the code re-acquisition request may be transmitted to a plurality of communication terminals such as UE_B 9.

For example, the ProSe server 7 may update the ProSe application code corresponding to the specific application based on the policy of the communication provider. More specifically, the communication provider may determine an application that stops the announcement, the monitoring or the execution of the match report, may check the ProSe application ID corresponding to the application, may select all the UEs that notify the ProSe application code corresponding to the ProSe application ID from the UE context, and may transmit the code re-acquisition request to all the UEs including the UE_A 8 which notify the ProSe application code.

The UE_A 8 receives the code re-acquisition request. The UE acquires the ProSe application code included in the code re-acquisition request. The UE detects that the ProSe application code is updated.

Subsequently, the UE_A 8 starts the procedure for acquiring the ProSe application code.

As described with reference to FIG. 7, as a specific procedure for acquiring the ProSe application code, the ProSe application code may be acquired by transmitting the discovery request message and performing the announcement request procedure.

As described with reference to FIG. 8, the ProSe application code may be acquired by transmitting the discovery request message and performing the monitoring request procedure.

If the ProSe application code requested to be updated is acquired through the announcement request procedure, a new ProSe application code may be acquired by performing the announcement request procedure, or a new ProSe application may be acquired by performing the announcement request procedure based on the execution of the announcement, for example, the transmission of the announcement signal.

If the ProSe application code requested to be updated is acquired through the monitoring request procedure, a new ProSe application code may be acquired by performing the monitoring request procedure, or a new ProSe application code may be acquired by performing the monitoring request procedure based on the execution of the monitoring, for example, the reception of the announcement signal.

The ProSe server 7 may notify the UE_A 8 of the new ProSe application code based on the reception of the discovery request.

The details of the specific processes of the announcement request procedure and the monitoring request procedure are already described, and thus, the description thereof will be omitted.

As described above, the network can actively update the ProSe application code based on the policy of the communication provider.

The ProSe application code is information which is assigned to the terminal authenticated by an in-network device of the communication provider, such as the ProSe server 7 and has high confidentiality which is required to prevent illegitimate acquisition or falsification by a third party. The communication provider actively updates the ProSe application code through the detection of any risk even though the ProSe application code notified to the UE is within the expiration date, and thus, it is possible to improve safety.

[1.3.8 Code Alert Notification Procedure]

In the revocation procedure of the ProSe application code described in 1.3.5, the method in which the ProSe server 7 actively invalidates the ProSe application code has been described.

In the ProSe application code update procedure described in 1.3.6 and the ProSe application code re-acquisition request procedure described in 1.3.7, the method in which the ProSe server 7 actively updates the ProSe application code has been described.

As stated above, the method in which the ProSe server 7 actively performs the procedure has been described, but the ProSe server 7 may not actively perform the procedure, and the communication terminal may actively invalidate or update the ProSe application code.

For example, in a case where a security problem is detected in the communication terminal and there is some doubt about the safety of the ProSe application code used by the communication terminal, the communication terminal may actively invalidate or update the ProSe application code.

Figure 13:
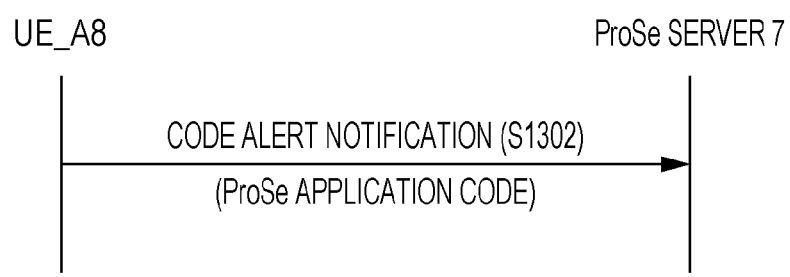
FIG. 13 is a diagram for describing a code alert notification procedure.

Specifically, for example, a procedure in which an alert for the ProSe application code is notified may be performed as shown in FIG. 13.

More specifically, the UE_A 8 transmits a code alert notification to the ProSe server 7. The code alert notification including the ProSe application code may be transmitted. As stated above, the UE_A 8 may request that the ProSe application code is invalidated by transmitting the code alert notification. Alternatively, the UE_A 8 may request that the ProSe application code is updated by transmitting the code alert notification.

The code alert notification including a command indicating that the alert for the doubt about the safety of the ProSe application code is notified may be transmitted. Alternatively, the code alert notification including a command indicating that the invalidation of the ProSe application code is requested may be transmitted. The code alert notification including a command indicating that the updating of the ProSe application code is requested may be transmitted.

As mentioned above, the information indicating that the updating of the ProSe application code is requested is not limited to the identification method using the command, and may be requested by defining a code alert notification message and transmitting the code alert notification message. More specifically, a message type of the notification message may be defined, and a notification message including the message type may be transmitted.

In a case where the plurality of ProSe application codes is retained, the UE_A 8 may transmit one code alert notification including the plurality of ProSe application codes, or may separately transmit the code alert notification.

The communication terminal is not limited to the UE_A 8, and the communication terminal such as the UE_B 9 which retains the ProSe application code may transmit the code alert notification, similarly to the UE_A 8. Hereinafter, an example in which the UE_A 8 transmits the code alert notification will be described.

The ProSe server 7 receives a code alert notification from the UE_A 8. The ProSe server acquires the ProSe application code included in the notification. The ProSe server detects that there is a problem about the safety for the ProSe application code acquired based on the notification.

The ProSe server 7 may start the procedure of invalidating the ProSe application code based on the code alert notification. The ProSe server 7 may start the procedure of updating the ProSe application code based on the code alert notification.

For example, in a case where the information indicating that the invalidation of the ProSe application code is requested is included in the code alert notification, the ProSe server may start the procedure of invalidating the ProSe application code based on the included information.

In a case where the information indicating that the updating of the ProSe application code is requested is included in the code alert notification, the ProSe server may start the procedure of updating the ProSe application code based on the included information.

As the procedure of invalidating the ProSe application code, the ProSe server 7 may perform the revocation request procedure started by transmitting the revocation request message and may invalidate the ProSe application code, as described in 1.3.5. The details of the revocation procedure are already described with reference to FIG. 10, and thus, the detailed description thereof will be omitted now.

As the procedure of updating the ProSe application code, the ProSe server 7 may perform the code update request procedure started by transmitting the code update request message and may invalidate the ProSe application code, as described in 1.3.6. The details of the code update request procedure are already described with reference to FIG. 11, and thus, the detailed description thereof will be omitted now.

As the procedure of updating the ProSe application code, the ProSe server 7 may perform the code re-acquisition request procedure started by transmitting the code re-acquisition request message and may invalidate the ProSe application code, as described in 1.37. The details of the code re-acquisition request procedure are already described with reference to FIG. 12, and thus, the detailed description thereof will be omitted now.

The ProSe server 7 may not invalidate or update the ProSe application code immediately after the code alert notification is received, and may invalidate or update the ProSe application code based on the determination based on the policy of the communication provider.

The specific content of the policy of the communication provider is not particularly specified, and may be determined and may be created by the operator based on the content of the code alert notification, or may be created by a predetermined operation rule. The code alert notification that does not match the policy of the communication provider may not be invalidated or updated, or the code alert notification may be destroyed.

As described above, in the case of the communication terminal, the communication terminal may actively invalidate or update the ProSe application code. More specifically, in the case of the communication terminal, the communication terminal may actively request to start an invalidation procedure or an update procedure of the ProSe application code actively performed by the communication provider.

In such a method, the communication terminal actively invalidates or updates the ProSe application code, and thus, it is possible to improve the safety of the ProSe application code, and it is possible to specifically invalidate or update the ProSe application code based on the determination of the communication provider when the invalidation or updating thereof is performed.

2. Modification Example

Although the embodiment of the present invention has been described with reference to the drawings, the specific structure is not limited to this embodiment, and designs within a scope without departing from the gist of the present invention are included in the present invention.

In each embodiment, the programs operated in each device are programs (programs causing a computer to function) that control a CPU such that the functions of the above-described embodiment are realized. The information items treated by these devices are temporally accumulated in a temporal storage device (for example, RAM) during the processing, are stored in storage devices such as various ROMs or HDDs, are read by the CPU if necessary, and are modified and rewritten.

Here, as a recording medium that stores the programs, any one of a semiconductor medium (for example, ROM or non-volatile memory card), an optical recording medium and magneto-optical medium (for example, digital versatile disc (DVD), magneto optical disc (MO), mini disc (MD), compact disc (CD), and BD), a magnetic recording medium (for example, magnetic tape and flexible disk) may be used. The functions of the above-described embodiment may be realized by executing the loaded program, or the functions of the present invention may be realized by processing the loaded program in cooperation with an operating system or another application program based on an instruction of the program.

In a case where the program is distributed to the market, the program may be distributed while being stored in a portable recording medium, and may be transmitted to a server computer connected via a network such as the Internet. In this case, a storage device of the server computer may also be included in the present invention.

Some or all of the devices of the above-described embodiment may be typically realized as large scale integration (LSI) which is integrated circuit. The functional blocks of the devices may be separately realized as chips, or some or all thereof may be integrated and realized as chips. The method of realizing the functional blocks as the integrated circuit is not limited to the LSI, and the functional blocks may be realized as a dedicated circuit, or a general-purpose processor. In a case where a technology of realizing the functional blocks as the integrated circuit replaced as the LSI appears by the advance of a semiconductor technology, it may be possible to use an integrated circuit produced using this technology.

Although LTE and WLAN (for example, IEEE802.11a/b/n) have been described as an example of a radio access network in the above-described embodiment, these devices and apparatuses may be connected by WiMAX instead of WLAN.

REFERENCE SIGNS LIST

1 Communication system
2 Core network
3 IP mobile communication network
5 PDN
7 ProSe server 7
8 UE_A
9 UE_B
11 HSS
13 PCRF
15 AAA
17 PGW
19 ePDG
21 SGW
23 MME
25 LTE AN
27 WLAN ANb
29 WLAN ANa
31 eNB
33 WLAN APb
35 WLAN APa
37 GW

The invention claimed is:

1. A User Equipment (UE) comprising:
transmitting and receiving circuitry that:
sends, in order to be authorized to announce, a discovery request to a device having a ProSe function, the discovery request containing:
a ProSe application ID,
an IMSI of the UE, and
a command indicating an announcement;
receives, from the device having the ProSe function, a discovery response as a response to the discovery request, the discovery response containing:
a first ProSe application code corresponding to the ProSe application ID, and
a value of a first timer associated with the first ProSe application code;
is able to send the first ProSe application code to a proximity UE until the first timer using the value of the first timer expires; and
receives, from the device having the ProSe function, a request message containing
the IMSI of the UE,
a second ProSe application code associated with the ProSe application ID, and
a value of a second timer associated with the second ProSe application code; and
control circuitry that:
starts the first timer using the value of the first timer, based on the reception of the discovery response; and
updates a code stored in the UE from the first ProSe application code to the second ProSe application code, based on the reception of the request message, wherein
the transmitting and receiving circuitry is further able to send the second ProSe application code to the proximity UE until the second timer using the value of the second timer expires.

2. The UE according to claim 1, wherein
the request message contains the first ProSe application code, and
the transmitting and receiving circuitry further sends, based on the reception of the request message, a response message indicating the second ProSe application code, to the device having the ProSe function.

3. A device having a ProSe function, the device comprising:
transmitting and receiving circuitry that:
receives, from a User Equipment (UE), a discovery request containing:
a ProSe application ID,
an IMSI of the UE, and
a command indicating an announcement;
sends, as a response to the discovery request, a discovery response to the UE, the discovery response containing:
a first ProSe application code associated with the ProSe application ID, and
a value of a first timer associated with the first ProSe application code; and
sending a request message to the UE, the request message including:
the IMSI of the UE,
a second ProSe application code associated with the ProSe application ID, and
a value of a second timer associated with the second ProSe application code;
wherein
the discovery response is used for the UE to start the first timer using the value of the first timer,
the first ProSe application code is used for the UE to send an announcement to a proximity UE until the first timer using the value of the first timer expires,
the request message is used for the UE to update a code stored in the UE from the first ProSe application code to the second ProSe application code, and
the second ProSe application code is used for the UE to send an announcement to the proximity UE until the second timer using the value of the second timer expires.

4. The device having the ProSe function according to claim 3, wherein the request message contains the first ProSe application code.

5. A communication control method performed by a User Equipment (UE), the communication control method comprising:
sending, in order to be authorized to announce, a discovery request to a device having a ProSe function, the discovery request containing:
a ProSe application ID,
an IMSI of the UE, and
a command indicating an announcement;
receiving, from the device having the ProSe function, a discovery response as a response to the discovery request, the discovery response containing:
a first ProSe application code associated with the ProSe application ID, and
a value of a first timer associated with the first ProSe application code;
starting the first timer using the value of the first timer, based on the reception of the discovery response;
sending the first ProSe application code to a proximity UE until the first timer using the value of the first timer expires;

receiving, from the device having the ProSe function, a request message containing:
  the IMSI of the UE,
  a second ProSe application code associated with the ProSe application ID, and
  a value of a second timer associated with the second ProSe application code; and
updating a code stored in the UE from the first ProSe application code to the second ProSe application code, based on the reception of the request message, wherein the second ProSe application code is able to be sent to the proximity UE until the second timer using the value of the second timer expires.

6. The communication control method of the UE according to claim 5, wherein
  the request message contains the first ProSe application code, and
  the communication control method further comprises sending, based on the reception of the request message, a response message indicating the second ProSe application code, to the device having the ProSe function.

7. A communication control method performed by a device having a ProSe function, the communication control method comprising:
  receiving, from a User Equipment (UE), a discovery request containing:
    a ProSe application ID,
    an IMSI of the UE, and
    a command indicating an announcement;
  sending, as a response to the discovery request, a discovery response to the UE, the discovery response containing:
    a first ProSe application code associated with the ProSe application ID and
    a value of a first timer associated with the first ProSe application code; and
  sending a request message to the UE, the request message including:
    the IMSI of the UE,
    a second ProSe application code associated with the ProSe application ID, and
    a value of a second timer associated with the second ProSe application code;
  wherein
    the discovery response is used for the UE to start the first timer using the value of the first timer,
    the first ProSe application code is used for the UE to send an announcement to a proximity UE until the first timer using the value of the first timer expires,
    the request message is used for the UE to update a code stored in the UE from the first ProSe application code to the second ProSe application code, and
    the second ProSe application code is used for the UE to send an announcement to the proximity UE until the second timer using the value of the second timer expires.

8. The communication control method performed by the device having a ProSe function according to claim 7, wherein
  the request message contains the first ProSe application code.

* * * * *

UNITED STATES PATENT AND TRADEMARK OFFICE
CERTIFICATE OF CORRECTION

PATENT NO. : 10,028,208 B2
APPLICATION NO. : 15/126164
DATED : July 17, 2018
INVENTOR(S) : Masayuki Enomoto et al.

Page 1 of 1

It is certified that error appears in the above-identified patent and that said Letters Patent is hereby corrected as shown below:

In the Specification

At Column 15, Lines 43 – 44, delete "a command indicating that".

At Column 15, Line 44, after "or" insert -- a command indicating that --.

At Column 15, Line 45, change "requested" to -- requested, --.

In the Claims

At Column 36, Line 24, change "sending" to -- sends --.

At Column 37, Line 14, change "of" to -- performed by --.

Signed and Sealed this
Twenty-fifth Day of June, 2019

Andrei Iancu
*Director of the United States Patent and Trademark Office*